United States Patent
Nakata

(10) Patent No.: US 9,141,293 B2
(45) Date of Patent: Sep. 22, 2015

(54) STORAGE DEVICE AND METHOD OF ACCESSING COPY DESTINATION DATA

(75) Inventor: Yasuyuki Nakata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 293 days.

(21) Appl. No.: 13/553,892

(22) Filed: Jul. 20, 2012

(65) Prior Publication Data
US 2013/0086308 A1 Apr. 4, 2013

(30) Foreign Application Priority Data
Sep. 29, 2011 (JP) .................................. 2011-215481

(51) Int. Cl.
G06F 3/06 (2006.01)
G06F 11/14 (2006.01)

(52) U.S. Cl.
CPC .............. *G06F 3/0611* (2013.01); *G06F 3/065* (2013.01); *G06F 3/0689* (2013.01); *G06F 11/1446* (2013.01); *G06F 2201/84* (2013.01)

(58) Field of Classification Search
CPC . G06F 11/1446; G06F 2201/84; G06F 12/06; G06F 12/08; G06F 3/0611; G06F 3/065; G06F 3/0689
USPC ................... 711/103, 162, E12.008, E12.103
See application file for complete search history.

(56) References Cited

U.S. PATENT DOCUMENTS

| 6,636,954 | B2 * | 10/2003 | Maeda | 711/162 |
| 2001/0049776 | A1 * | 12/2001 | Maeda | 711/162 |
| 2004/0186900 | A1 | 9/2004 | Nakano et al. | |
| 2008/0126712 | A1 * | 5/2008 | Mizushima | 711/141 |
| 2009/0157990 | A1 | 6/2009 | Yamada et al. | |
| 2010/0023716 | A1 | 1/2010 | Nemoto et al. | |
| 2010/0250885 | A1 | 9/2010 | Nakata | |
| 2013/0185490 | A1 * | 7/2013 | Mizushima | 711/103 |
| 2014/0052947 | A1 * | 2/2014 | Usui | 711/162 |

FOREIGN PATENT DOCUMENTS

| JP | 2002-373093 | 12/2002 |
| JP | 2004-199711 | 7/2004 |

(Continued)

OTHER PUBLICATIONS

Japanese Office Action mailed Mar. 24, 2015 for corresponding Japanese Patent Application No. 2011-215481, with Partial English Translation, 6 pages.

*Primary Examiner* — Nathan Sadler
*Assistant Examiner* — Mehdi Namazi
(74) *Attorney, Agent, or Firm* — Fujitsu Patent Center

(57) ABSTRACT

A storage device copies copy source data stored in a copy source volume to a copy destination volume and manages copied data in units of generations. The storage device includes a first storing unit, a second storing unit, and a processor. The first storing unit stores information representing presence/no-presence of a copy in association with a logical address of the copy destination volume in units of generations. The second storing unit stores a physical address of the copy destination volume in units of generations. The processor determines, when receiving an access request for a copy destination volume, presence/non-presence of a copy of a logical address for which the access request is made by using information in the first storing unit, and to access a physical address of the copy destination volume acquired from the second storing unit for a generation designated by a result of the determination.

8 Claims, 14 Drawing Sheets

(56) References Cited

FOREIGN PATENT DOCUMENTS

| JP | 2004-342050 A | 12/2004 |
|----|---------------|---------|
| JP | 2007-94472 A | 4/2007 |
| JP | 2009-123187 A | 6/2009 |
| JP | 2009-146228 A | 7/2009 |
| JP | 2010-26939 | 2/2010 |
| JP | 2010-26939 A | 2/2010 |
| JP | 2010-238009 | 10/2010 |

* cited by examiner

| LOGICAL LBA | PHYSICAL LBA |
|---|---|
| 0x00000000 | 0x00000080 |
| 0x00000010 | 0xFFFFFFFF |
| 0x00000020 | 0xFFFFFFFF |
| 0x00000030 | 0x00000090 |
| ⋮ | ⋮ |
| 0x01FFFFF0 | 0xFFFFFFFF |

32

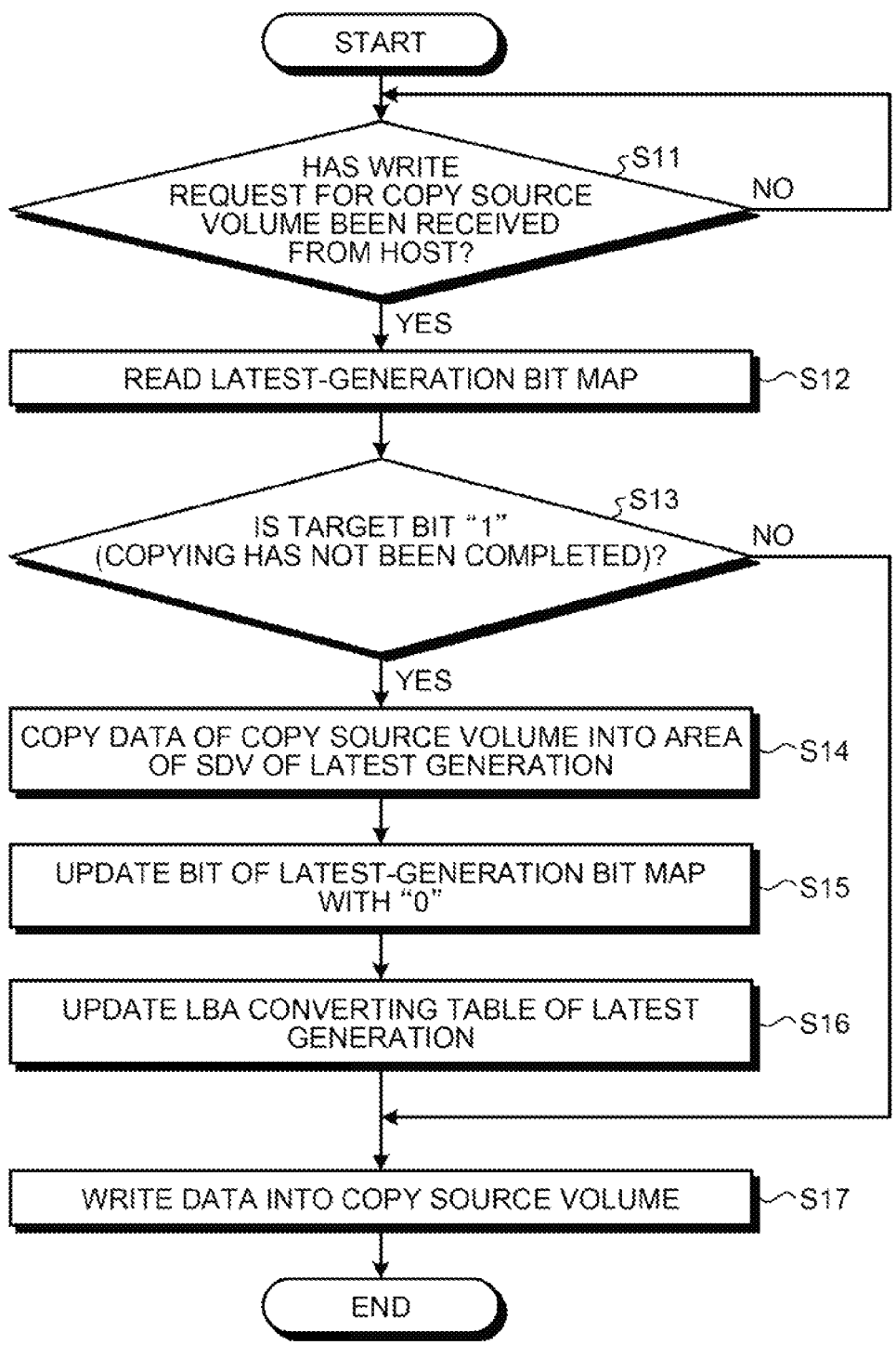

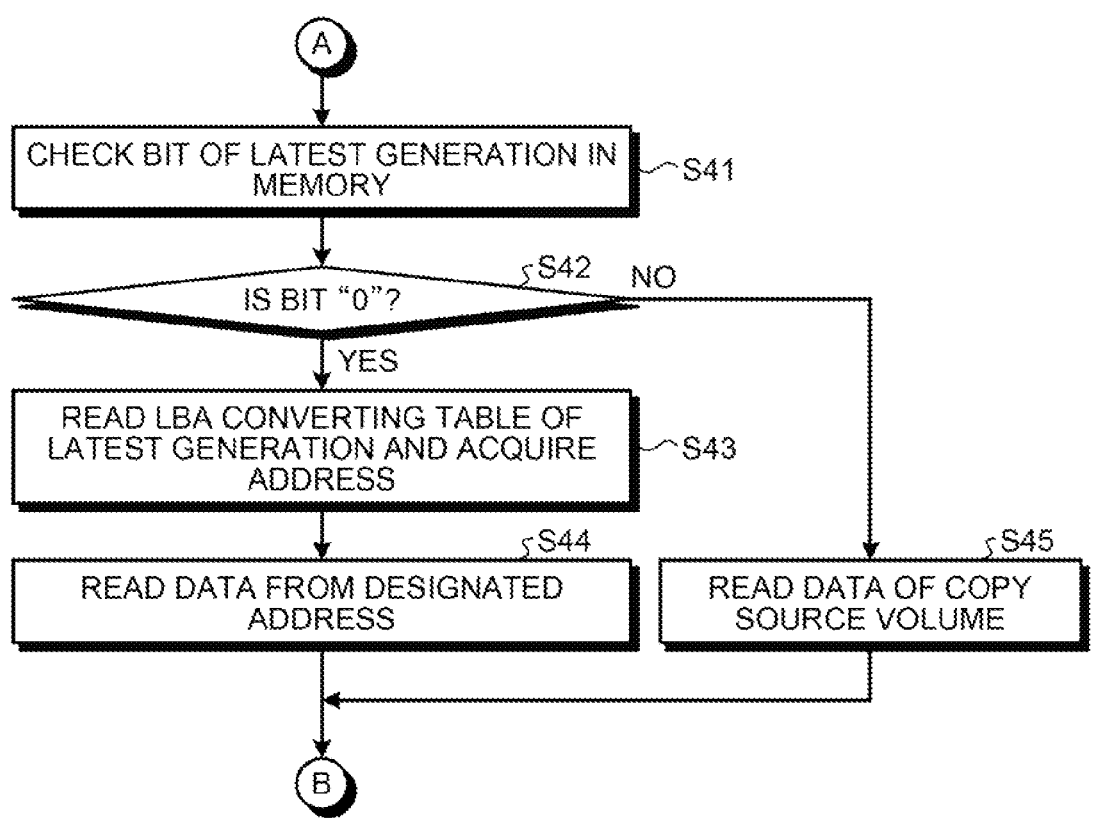

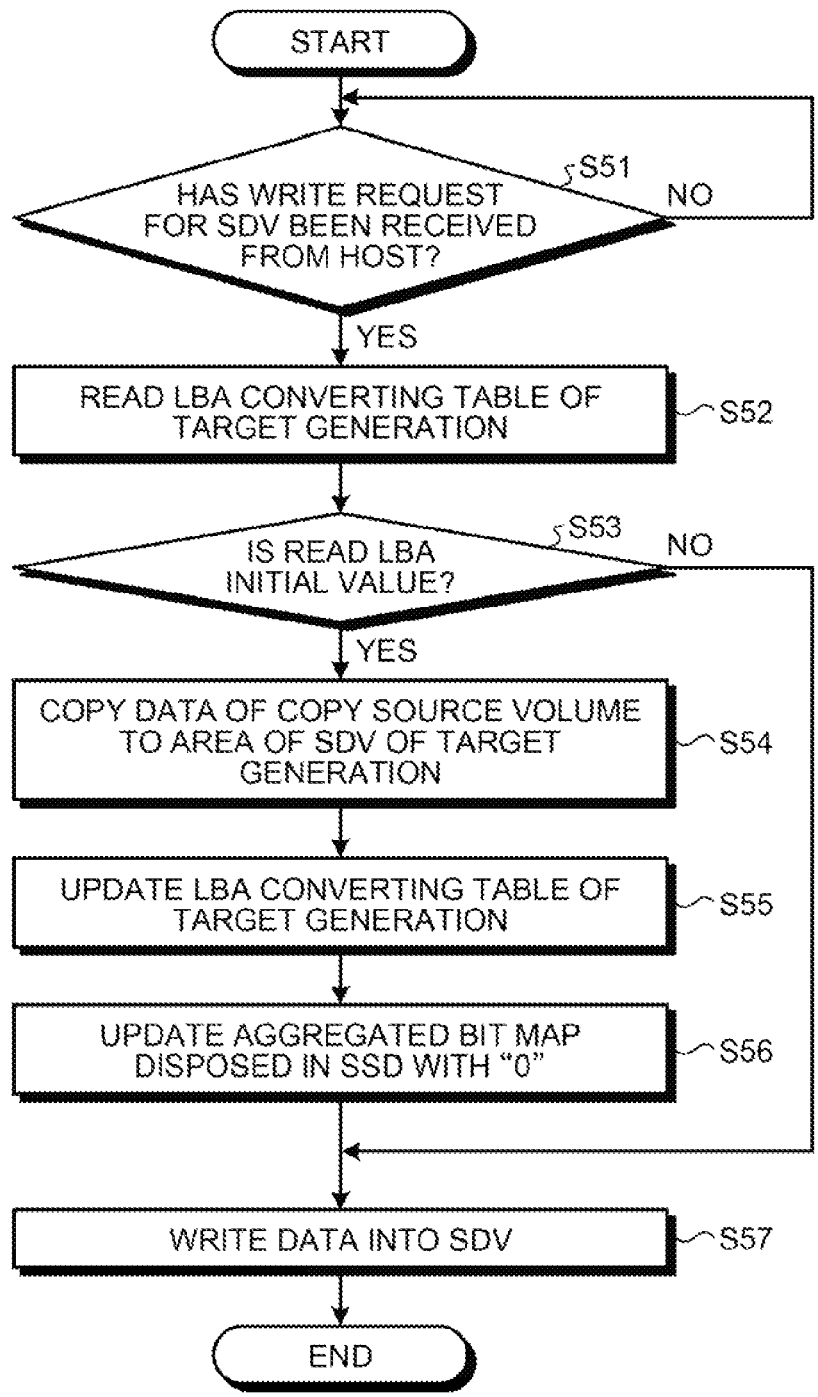

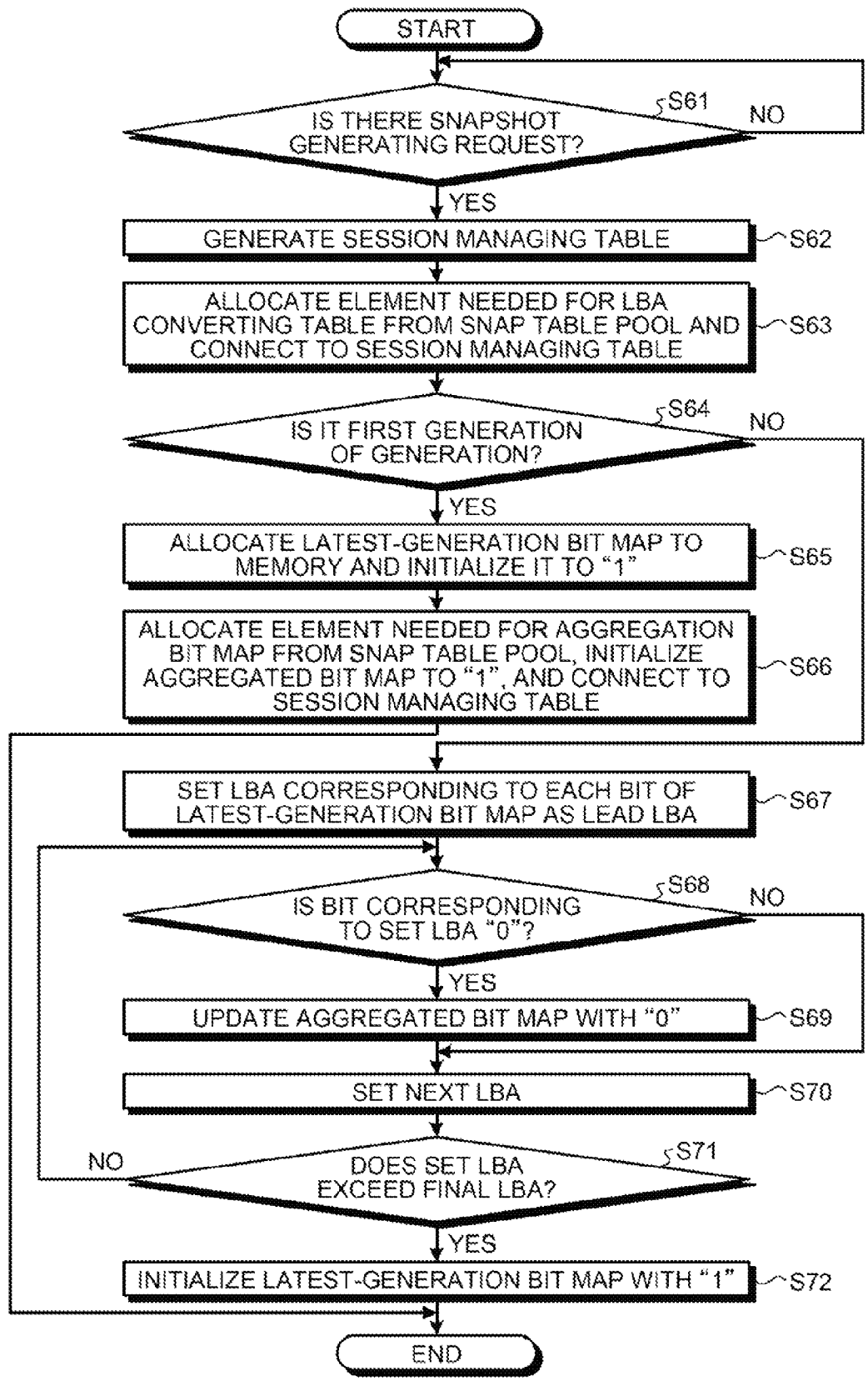

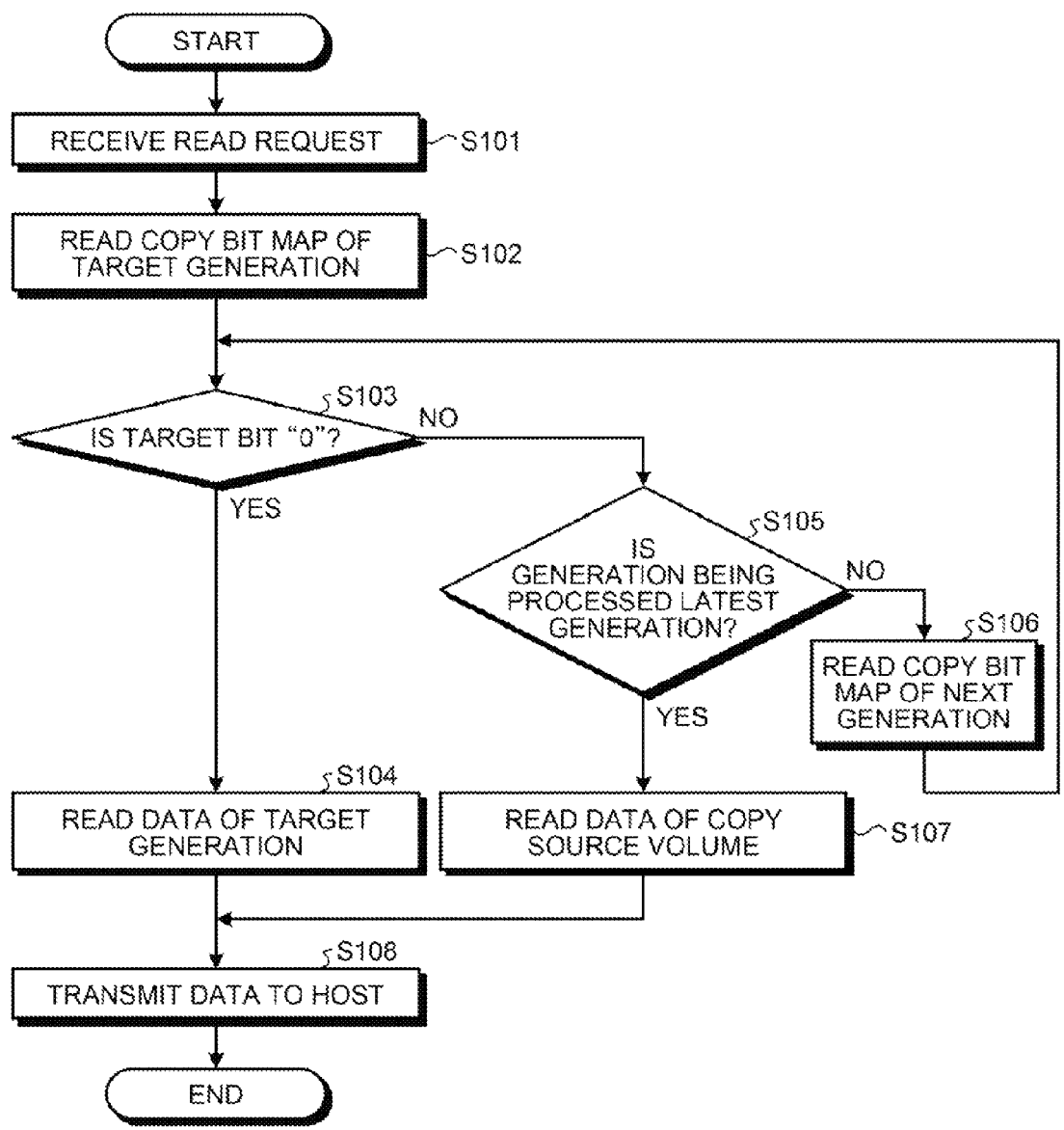

STORAGE DEVICE AND METHOD OF ACCESSING COPY DESTINATION DATA

CROSS-REFERENCE TO RELATED APPLICATION(S)

This application is based upon and claims the benefit of priority of the prior Japanese Patent Application No. 2011-215481, filed on Sep. 29, 2011, the entire contents of which are incorporated herein by reference.

FIELD

The embodiments discussed herein are related to a storage technique.

BACKGROUND

As one of methods for backing up data in a storage product or a computer, there is a technique called "copy-on-write". According to the copy-on-write, not at a time point when a snapshot is generated but at a time point when data is requested to be written into a copy source volume, the data before writing, which is located in a part of the copy source volume that has been requested for is backed up to a copy destination volume.

In addition, as a backup technique extending the copy-on-write, there is a technique for performing generation management of a part (target area) for which writing has been requested by using a copy bit map. The copy bit map is used for managing, for each generation, whether or not data of a target area of the copy source volume has been copied to the copy destination volume.

FIG. 16 is a diagram that illustrates the data structure of a conventional copy bit map. As illustrated in FIG. 16, the copy bit map stores for each generation whether or not the data of each target area has been copied to the copy destination volume. In FIG. 16, "0" is a bit value representing that the data of the target area is present in a corresponding storage area of a copy destination volume. On the other hand, "1" is a bit value representing that the data of the target area is not present in a corresponding storage area of a copy destination volume.

With regard to the conventional techniques, please see Japanese Laid-open Patent Publication No. 2010-26939, Japanese Laid-open Patent Publication No. 2004-199711, Japanese Laid-open Patent Publication No. 2002-373093, and Japanese Laid-open Patent Publication No. 2010-238009, for example.

However, according to the copy-on-write, since a copy bit map for each generation is secured in memory every time the number of backup generations is increased, there may be cases where the copy bit map is not secured due to a shortage of the memory capacity, and the number of generations is not increased. In consideration of a case where the number of generations is not increased due to a shortage of the memory capacity, the copy bit map may be arranged in a disk.

However, in the copy-on-write, in a case where a conventional copy bit map is arranged in a disk, when the number of backup generations is increased, there are cases where the performance deteriorates. For example, in a case where a process of reading data of a target area of a specific generation into a copy destination volume is performed, there are cases where it takes a time for the reading process. FIG. 17 is a diagram that illustrates a conventional reading process for a copy destination volume.

First, in the reading process, when a storage device receives a read request, for example, from a host in Step S101, the storage device reads a copy bit map of a target generation as a reading target in Step S102. Then, the storage device determines in Step S103 whether a bit corresponding to the target area is 0 (presence of data) by using the read copy bit map.

Then, in a case where the target bit is determined to be 0 (Yes in Step S103), the storage device converts the target area corresponding to the target bit into a physical address and reads data of the target generation from the converted physical address in Step S104. On the other hand, in a case where the target bit is determined not to be 0 (No in Step S103), the storage device determines whether or not the generation being processed is a latest generation in Step S105. In a case where the generation being processed is determined not to be the latest generation (No in Step S105), the storage device reads a copy bit map of the next generation in Step S106, and the process proceeds to Step S103 so as to determine the presence of data of the target area.

On the other hand, in a case where the generation being processed is determined to be the latest generation (Yes in Step S105), the storage device reads the data of the target area of the copy source volume in Step S107. When the data of the target area is read in Step S104 or Step S107, the storage device transmits the data to the host in Step S108.

As above, in a case where data corresponding to the target area is not present for the generation as the reading target, the storage device repeatedly reads the copy bit map of a generation other than the generation from a disk and determines whether or not the data is present. As a result, in a case where the number of times of reading the copy bit maps of different generations increases, the performance deteriorates.

SUMMARY

According to an aspect of an embodiment, a storage device copies copy source data stored in a copy source volume to a copy destination volume and manages copied data in units of generations. The storage device includes a first storing unit that stores information representing presence/no-presence of a copy in association with a logical address of the copy destination volume in units of generations, a second storing unit that stores a physical address of the copy destination volume that corresponds to the logical address in units of generations, and a processor that is programmed to determine, when receiving an access request for a copy destination volume, presence/non-presence of a copy of a logical address for which the access request is made by using information which is stored in the first storing unit, and to access a physical address of the copy destination volume acquired from the second storing unit for a generation designated by a result of the determination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flowchart that illustrates a sequence of a writing process of writing data into a copy source volume;

FIG. 10B is another flowchart that illustrates a sequence of a reading process for the copy destination volume;

FIG. 11 is a flowchart that illustrates a sequence of a writing process of writing data into the copy destination volume;

FIG. 12 is a flowchart that illustrates a sequence of generating a snapshot;

FIG. 17 is a diagram that illustrates a conventional reading process for a copy destination volume.

DESCRIPTION OF EMBODIMENTS

Preferred embodiments of the present invention will be explained with reference to accompanying drawings. In the embodiments, as a backup technique that is used for copy-on-write, a snap OPC (one point copy) will be described. However, the present invention is not limited by the embodiments.

[a] First Embodiment

Configuration of Storage Device According to First Embodiment

Figure 1:
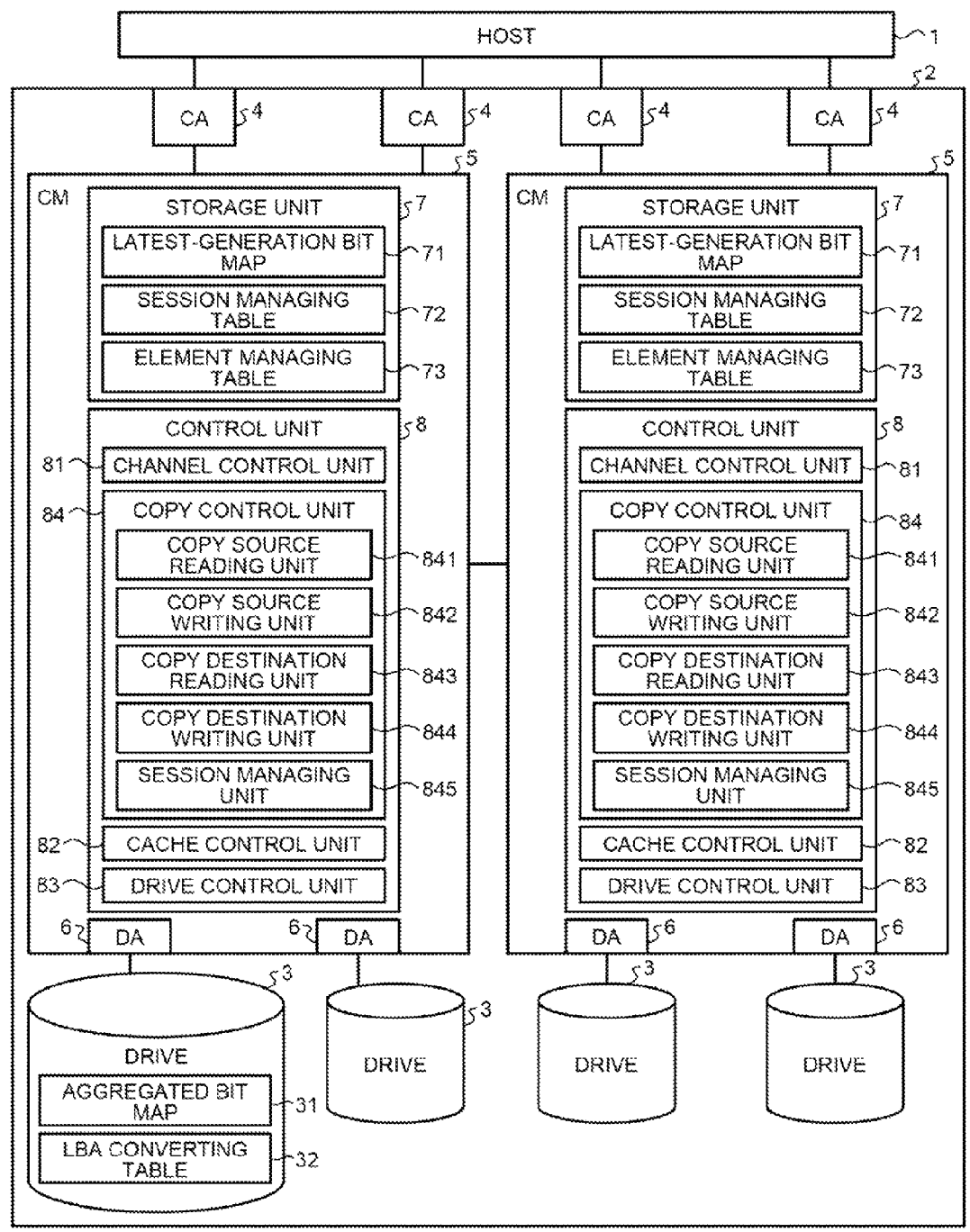
FIG. 1 is a functional block diagram that illustrates the configuration of a storage device according to a first embodiment.

FIG. 1 is a functional block diagram that illustrates the configuration of a storage device according to a first embodiment. As illustrated in FIG. 1, a storage device 2 is connected to a host 1 and backs up copy source data that is stored in a copy source volume to a copy destination volume that is managed for each generation in accordance with a request from the host 1. In addition, the storage device 2 includes drives 3, channel adapters (CA) 4, and controller modules (CM) 5.

The drive 3 is a data storage device that stores data therein and, for example, is an HDD (hard disk drive) or an SSD (solid state drive). The drive 3 includes an aggregated bit map 31 and an LBA (logical block address) converting table 32. The aggregated bit map 31 stores presence/no-presence of a copy of data of an area of the copy source volume in each copy destination volume for each generation in association with the area. The LBA converting table 32 stores the address of a physical area of the copy destination volume for each area of the copy source volume for each generation. It is preferable that the drive 3 storing the aggregated bit map 31 and the LBA converting table 32 be the SSD so as to increase the speed of an access process. However, the drive 3 is not limited thereto but may be the HDD. The data structures of the aggregated bit map 31 and the LBA converting table 32 will be described later.

The CM 5 corresponds to a storage control device that manages resources such as the drives 3, the CAs 4, a storage unit 7 to be described later, and the like. The CM 5 includes drive-side adapters (DAs) 6, a storage unit 7, and a control unit 8. The DA 6 is a communication interface that is communicably connected with the drive 3. The storage unit 7, for example, is a semiconductor memory device such as a cache memory device, RAM (random access memory), or flash memory. In addition, the storage unit 7 includes a latest-generation bit map 71, a session managing table 72 and an element managing table 73. The latest-generation bit map 71 stores a copy state of copying data of a target area of the copy source volume into a copy destination volume of a latest generation. The session managing table 72 manages a session (hereinafter, synonymous with a generation). The element managing table 73 manages elements that are used in the session managing table 72. The data structures of the latest-generation bit map 71, the session managing table 72, and the element managing table 73 will be described later.

The control unit 8 is an integrated circuit such as an ASIC (application specific integrated circuit) or an FPGA (field programmable gate array) or an electronic circuit such as a CPU (central processing unit) or an MPU (micro processing unit). In addition, the control unit 8 includes a channel control unit 81, a cache control unit 82, a drive control unit 83, and a copy control unit 84.

The channel control unit 81 controls the CAs 4. The cache control unit 82 controls the storage unit 7 that is, for example, a cache. The drive control unit 83 controls the drives 3. The copy control unit 84 controls a process that relates to backup at the time of performing a snap OPC. Here, the snap OPC is a technique of only backing up data before update of an area that is updated through writing or the like among data of the copy source volume to the copy destination volume when backup is performed. The snap OPC manages the target area for which writing is performed for each generation.

Figure 2:
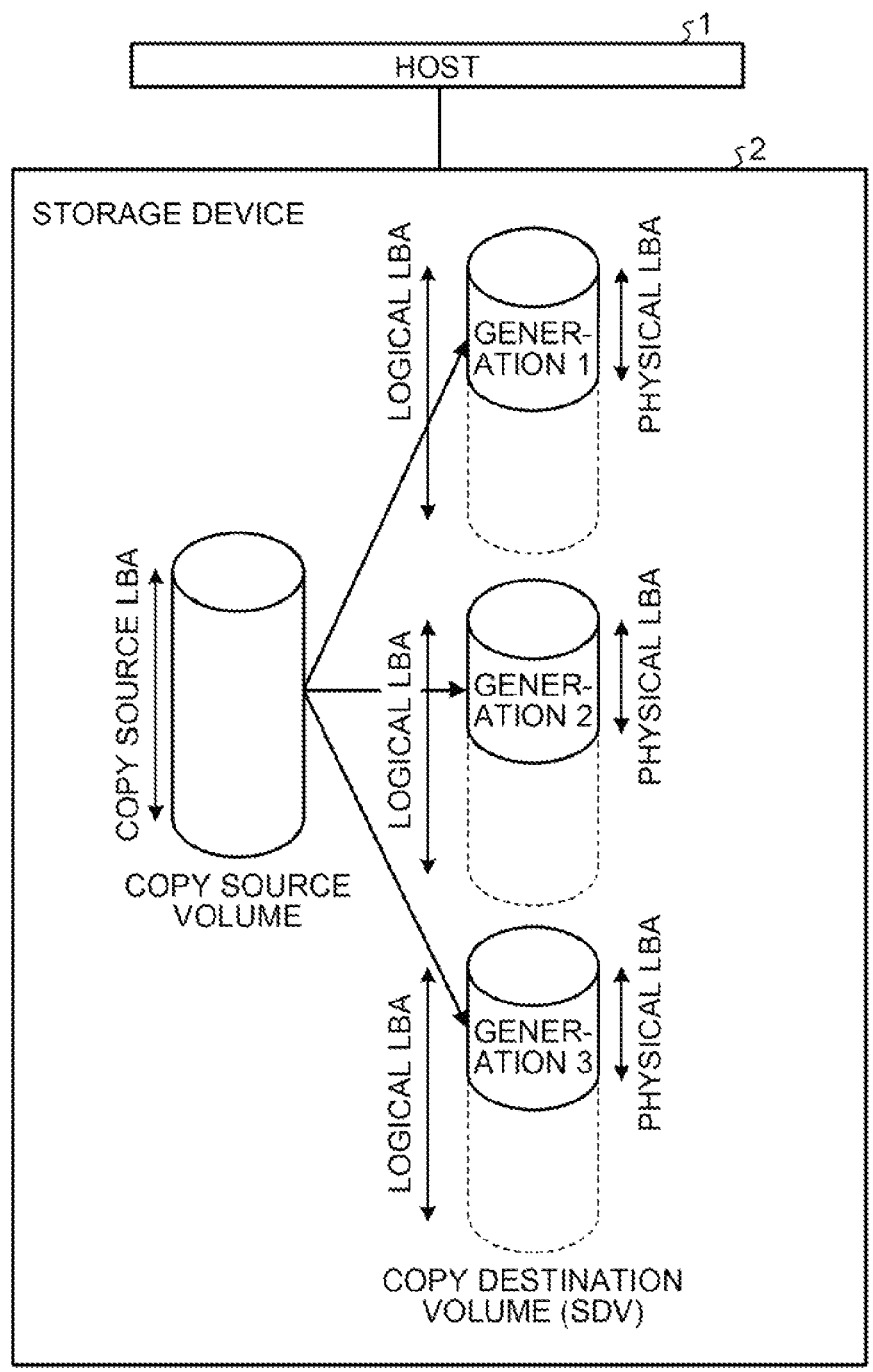
FIG. 2 is a diagram that illustrates a snap OPC.

FIG. 2 is a diagram that illustrates the snap OPC. As illustrated in FIG. 2, in the storage device 2, a copy source volume and copy destination volumes are allocated to the drives 3. There is a plurality of generations of the copy destination volumes, and the copy destination volume of each generation uses an SDV (snap data volume). The SDV is a virtual volume and allows the host 1 to recognize a large logical capacity by using an actually small physical capacity. In other words, the host 1 recognizes that the physical capacity of a copy source of the copy source volume and the logical area of the copy destination volume of each generation have the same capacity. In other words, a maximum value of the copy source LBA of the copy source volume is the same as a maximum value of the logical LBA that represents a part of the logical area of each copy destination volume at which data is present.

In such environments, when a write request for writing data into the copy source volume is received, the storage device 2 copies only data before writing of a part for which the write request has been made among the data of the copy source volume into the copy destination volume of the latest generation.

Referring back to FIG. 1, the copy control unit 84 includes a copy source reading unit 841, a copy source writing unit 842, a copy destination reading unit 843, a copy destination writing unit 844, and a session managing unit 845.

When a read request for reading for the copy source volume is received from the host 1, the copy source reading unit 841 reads data of the target area for which the read request has been made from the copy source volume. Then, the copy source reading unit 841 transmits the read data to the host 1.

When a write request for writing data into the copy source volume is received from the host 1, the copy source writing unit 842 checks whether or not the data of the target area, for which the request has been made, has been copied into the copy destination volume of the latest generation by using the latest-generation bit map 71. Here, the data structure of the latest-generation bit map 71 will be described with reference to FIG. 3.

Figures 3, 4:
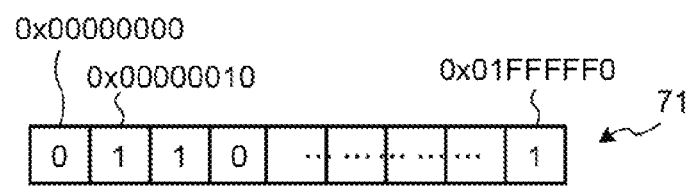
FIG. 3 is a diagram that illustrates the data structure of a bit map of a latest generation according to the first embodiment.
FIG. 4 is a diagram that illustrates the data structure of an LBA converting table.

FIG. 3 is a diagram that illustrates the data structure of the bit map of the latest generation according to the first embodiment. As illustrated in FIG. 3, the latest-generation bit map 71 stores whether or not the data of each target area of the copy source volume has been copied into the copy destination volume of the latest generation. The size of the latest-generation bit map 71 depends on the capacity of the copy source volume. For example, in a case where the copy source volume has a capacity of 16 GB, the number of bits corresponding to "0x02000000" (hexadecimal number) blocks are allocated. In a case where 16 blocks (8 kilobytes (KB)) are managed by using one unit (one bit), the size is 2 megabytes (MB).

In the example illustrated in FIG. 3, "0" is a bit value that represents a state in which copying has been completed. On the other hand, "1" is a bit value that represents a state in which copying has not been completed. For example, in a case where the logical LBA as the target area is "0x00000000", "0" that represents a state in which copying the data of the target area has been completed is stored. In a case where the logical LBA as the target area is "0x00000010", "1" that illustrates a state in which copying of the data of the target area has not been completed is stored.

Referring back to FIG. 1, in a case where the data of the target area, for which the write request has been made, has not been copied to the copy destination volume of the latest generation, the copy source writing unit 842 copies the data of the area of the copy source volume to the copy destination volume of the latest generation. In addition, the copy source writing unit 842 stores "0" that represents a state in which copying has been completed in a bit of the latest-generation bit map 71 that corresponds to the target area and stores the physical address of the copy destination corresponding to the target area in the LBA converting table 32 of the latest generation. In addition, the copy source writing unit 842 writes data requested to be written into the target area for which the write request has been made.

In a case where the data of the target area, for which the write request has been made, has been copied to the copy destination volume of the latest generation, the copy source writing unit 842 writes the data requested to be written into the target area for which the write request has been made. In such a case, since the data before writing has been copied to the copy destination volume, the data of the target area of the copy source volume is not copied to the copy destination volume.

Here, the data structure of the LBA converting table 32 will be described with reference to FIG. 4. FIG. 4 is a diagram that illustrates the data structure of the LBA converting table 32. As illustrated in FIG. 4, the LBA converting table 32 stores the logical LBA of the copy destination volume that corresponds to the area of the copy source volume and the physical LBA that represents a part in which the data of the physical area of the copy destination volume is present in association with each other. In other words, the LBA converting table 32 is a table that enables the logical LBA of the data stored in the copy destination volume to be converted into a physical LBA.

In the example illustrated in FIG. 4, a table for one generation in a case where the copy source volume is a "0x02000000" block (16 GB) is illustrated. In a portion for which copying to the copy destination volume has not been performed, "0xFFFFFFFF" (hexadecimal number) is stored as an initial value.

Referring back to FIG. 1, in a case where a read request for the copy destination volume is received, the copy destination reading unit 843 determines the presence/no-presence of a copy of the logical address that is requested to be accessed by using information, which is stored in the aggregated bit map 31, representing the presence/no-presence of a copy. Then, the copy destination reading unit 843 accesses the physical address of the copy destination volume that is acquired from the LBA converting table 32 of a generation that is designated based on a result of the determination.

For example, in a case where a read request for the copy destination volume is received from the host 1, the copy destination reading unit 843 reads the presence/non-presence of a copy relating to the target area from the aggregated bit map 31 by using the target area for which the request has been made as a key. Then, the copy destination reading unit 843 acquires the presence/non-presence of a copy of an aggregated generation that includes the target generation for which the request has been made based on the presence/non-presence of a copy relating to the read target area. The aggregated generation represents a generation that is configured by a plurality of generations as a package, for example, a generation that is configured by four generations from a first generation to a fourth generation. Here, the data structure of the aggregated bit map 31 will be described with reference to FIG. 5.

Figure 5:
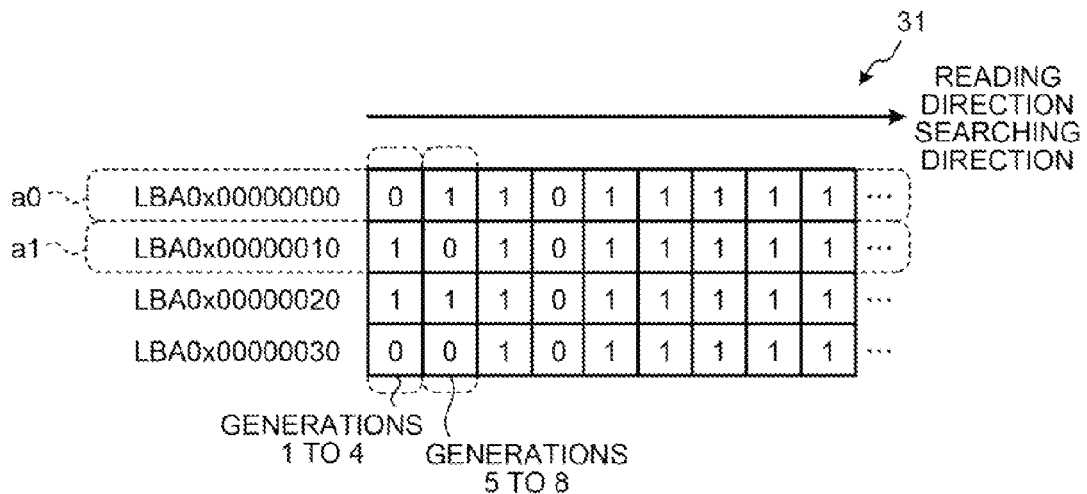
FIG. 5 is a diagram that illustrates the data structure of an aggregated bit map according to the first embodiment.

FIG. 5 is a diagram that illustrates a data structure of the aggregated bit map according to the first embodiment. As illustrated in FIG. 5, the aggregated bit map 31 stores the presence/no-presence of a copy for a copy destination volume for each aggregated generation in association with the logical LBA. One unit of the logical LBA is set as 16 blocks (8 kilobytes (KB)). Here, "0" is a bit value that represents a state in which data of the target area of the copy source volume has been completed to be copied to a copy destination volume of one of a plurality of generations. On the other hand, "1" is a bit value that represents a state in which data of the target area of the copy source volume has not been completed to be copied to any one copy destination volume of one of a plurality of generations. For example, as denoted by reference symbol a0, in a case where the target area is LBA 0x00000000 (hexadecimal number), the presence/no-presence of a copy for the copy destination volume for each four generations set as a package is stored as "011011111 . . . ". In other words, as the presence/no-presence of a copy of generations 1 to 4, "0" representing a state in which copying has been completed is stored, and as the presence/no-presence of a copy of generations 5 to 8, "1" representing a state in which copying has not been completed is stored. As denoted by reference symbol a1, in a case where the target area is "LBA 0x00000010", the presence/no-presence of a copy for a copy destination volume for each four generations as a package is stored as "101011111 . . . ". In other words, as the presence/no-presence of a copy of generations 1 to 4, "1" representing a state in which copying has not been completed is stored, and as the presence/no-presence of a copy of generations 5 to 8, "0" representing a state in which copying has been completed is stored.

In addition, in the aggregated bit map 31, it is assumed that information of the latest generations is not reflected on the aggregated generations. The reason for this is that there is the latest-generation bit map 71 as the information of the latest generation. However, the aggregated bit map 31 is not limited thereto, and the information of the latest generations may be reflected on the aggregated generations. In the example illustrated in FIG. 5, in the aggregated bit map 31, although one aggregated generation has been described to be acquired by packaging each four generations, the packaging is not limited to be performed for each four generations, but it may be performed, for example, for each three generations or for each five generations.

Referring back to FIG. 1, in a case where the presence/no-presence of a copy of the aggregated generation that includes the target generation is in a state in which copying has been completed, the copy destination reading unit 843 reads the address of the physical area corresponding to the target area from the LBA converting table 32 for the target generation. In a case where the read address is not the initial value, the copy destination reading unit 843 reads data represented by the address. On the other hand, in a case where the read address is the initial value, the copy destination reading unit 843 reads data of a generation other than the target generation, which are included in the aggregated generation determined to be in the state in which copying has been completed, in a similar manner to the reading of the data of the target generation.

On the other hand, in a case where the presence/no-presence of a copy including the target generation is not in a state in which copying has been completed, the copy destination reading unit 843 searches for an aggregated generation that is in a state in which copying has been completed based on the presence/no-presence of a copy relating to the target area, which has been read from the aggregated bit map 31. Then, the copy destination reading unit 843 reads the addresses of the physical areas of the target area from the LBA converting table 32 corresponding to each generation and acquires addresses that have been read and are addresses other than the initial value sequentially from the leading generation to the final generation that are included in the aggregated generation that is in the state in which copying has been completed. Then, the copy destination reading unit 843 reads data represented by the acquired addresses other than the initial value.

In addition, the copy destination reading unit 843 transmits the read data to the host 1. In a case where the information of the latest generation is not reflected on the aggregated generations of the aggregated bit map 31, the copy destination reading unit 843 sets up to an aggregated generation that includes a generation that is one generation before the latest generation as search targets. Then, in a case where the aggregated generation including the generation that is one generation before the latest generation is not in a state in which copying has been completed, the copy destination reading unit 843 may refer to the presence/no-presence of a copy corresponding to the target area by using the latest-generation bit map 71.

When a request for writing data into the copy destination volume is received from the host 1, the copy destination writing unit 844 reads the address of the physical area for the target area for which the request has been made from the LBA converting table 32 of the target generation for which the request has been made. In addition, in a case where the read address is the initial value, the copy destination writing unit 844 copies data of the target area of the copy source volume to an empty area of the target generation. The reason for this is to prevent, for example, in a case where the length of the data for which the write request has been made is shorter than the block length of the unit for reading the target area, data mismatching that occurs when the data of a length corresponding to the request is written, and then the same area is read.

In addition, the copy destination writing unit 844 updates the physical LBA of the LBA converting table 32 of the target generation with the address of the copied physical area. In addition, the copy destination writing unit 844 updates the bit of the aggregated generation that includes the target generation to the copy-completed state in the target area of the aggregated bit map 31. Then, the copy destination writing unit 844 writes the data for which the request has been made in the target area of the copy destination volume of the target generation for which the write request has been made.

Furthermore, in a case where the read address is a value other than the initial value, the copy destination writing unit 844 writes the data for which the request has been made in the target area of the copy destination volume of the target generation for which the request has been made.

In a case where a request for generating a snapshot is received from the host 1, the session managing unit 845 generates a session managing table 72 corresponding to a session (synonymous with a generation) when a session is generated in the copy destination volume. In addition, the session managing unit 845 allocates an element that is needed for the LBA converting table 32 from a storage pool that is generated in advance in the drive 3. Here, the storage pool, which is generated in advance, may be dedicatedly used as a snapshot area and is called a "snap table pool".

In addition, in a case where a first session is generated, the session managing unit 845 allocates an element that is needed for the aggregated bit map 31 from the snap table pool and initializes (invalidates) an area corresponding to the allocated element with "1" that represents a state in which copying has not been completed. In such a case, the session managing unit 845 generates the latest-generation bit map 71 in the storage unit 7 and initializes the latest-generation bit map 71 as "1" that represents a state in which copying has not been completed. For example, in a case where the copy source volume is 16 GB, bits (2 megabytes (MB)) corresponding to a block of "0x02000000" (hexadecimal number) are initialized to "1" that represents a state in which copying has not been completed, with 16 blocks (8 kilo bytes (KB)) used as one unit.

Figure 6:
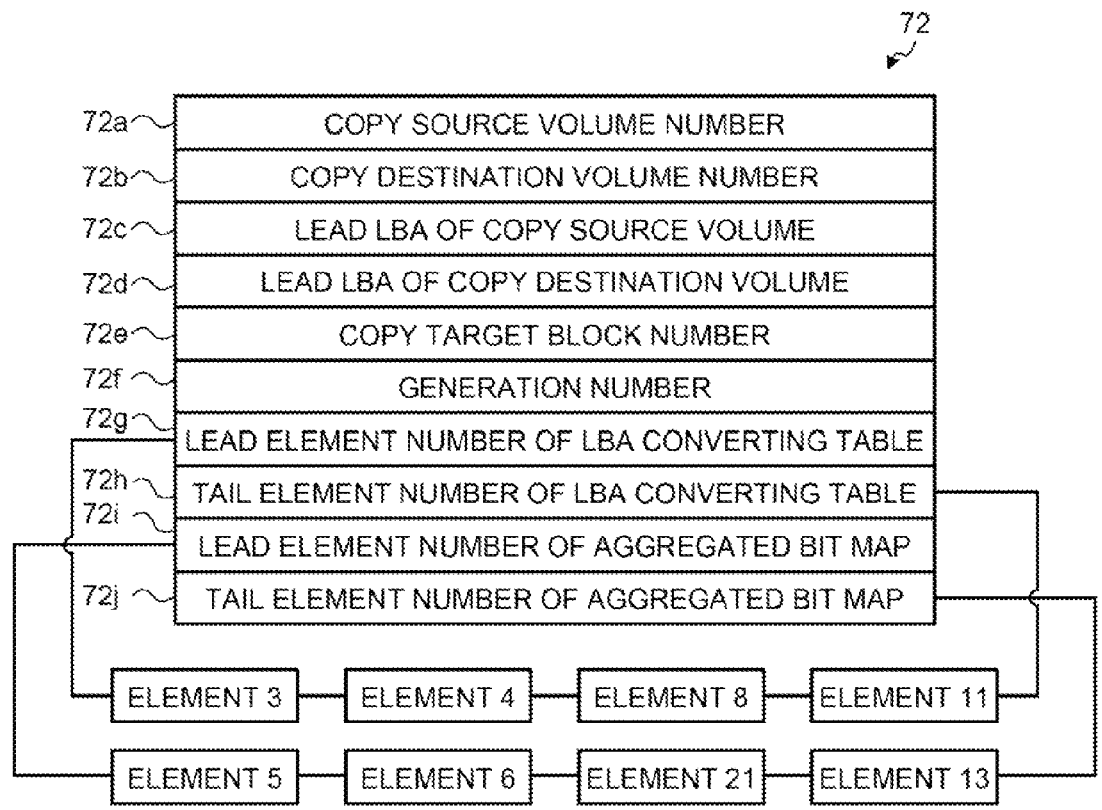
FIG. 6 is a diagram that illustrates the data structure of a session managing table.

Here, the data structure of the session managing table 72 will be described with reference to FIG. 6. FIG. 6 is a diagram that illustrates the data structure of the session managing table. As illustrated in FIG. 6, the session managing table 72 stores a copy source volume number 72a, a copy destination volume number 72b, a lead LBA72c of the copy source volume, and a lead LBA72d of the copy destination volume in association with a generation number 72f. In addition, the session managing table 72 stores a copy target block number 72e, a lead element number 72g of the LBA converting table, and a tail element number 72h in association with a generation number 72f. Furthermore, the session managing table 72 stores a lead element number 72i and a tail element number 72j of the aggregated bit map in association with a generation number 72f.

The copy source volume number 72a represents an identification number of the copy source volume. The copy destination volume number 72b represents an identification number of the copy destination volume. The lead LBA72c of the copy source volume represents a lead LBA of the copy target area of the copy source volume. The lead LBA72d of the copy destination volume represents a lead LBA of the copy target area of the copy destination volume. The copy target block number 72e represents a total number of blocks of the copy target. The generation number 72f represents the generation number of the copy destination volume.

The lead element number 72g of the LBA converting table represents the identification number of a lead element out of elements that are needed for the LBA converting table 32 of the generation that is represented by a generation number. The tail element number 72h of the LBA converting table represents the identification number of a tail element out of elements that are needed for the LBA converting table 32 of the generation that is represented by a generation number. The lead element number 72i of the aggregated bit map 31 represents the identification number of a lead element out of elements that are needed for the aggregated bit map 31. The tail element number 72j of the aggregated bit map 31 represents the identification number of a tail element out of the elements that are needed for the aggregated bit map 31. The lead element number 72i and the tail element number 72j of the aggregated bit map 31 are set only for a generation that is generated first, in other words, the oldest generation.

Figure 7:
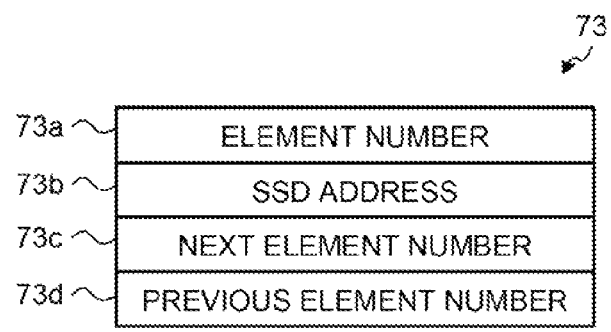
FIG. 7 is a diagram that illustrates the data structure of an element managing table.

Elements are managed by the element managing table 73. The data structure of the element managing table 73 will be described with reference to FIG. 7. FIG. 7 is a diagram that illustrates the data structure of the element managing table. As illustrated in FIG. 7, the element managing table 73 stores an element number 73a, an SSD address 73b, a next element number 73c, and a previous element number 73d in association with one another. The element number 73a represents the identification number of the element. The SSD address 73b represents, in a case where the information of the LBA converting table 32 or the aggregated bit map 31 is stored in an SSD, the address at which the information is stored in the SSD. The next element number 73c represents the identification number of a succeeding element that is used for storing the information of the LBA converting table 32 or the aggregated bit map 31. The previous element number 73d represents the identification number of an element that is prior to being used for storing the information of the LBA converting table 32 or the aggregated bit map 31.

Figure 8:
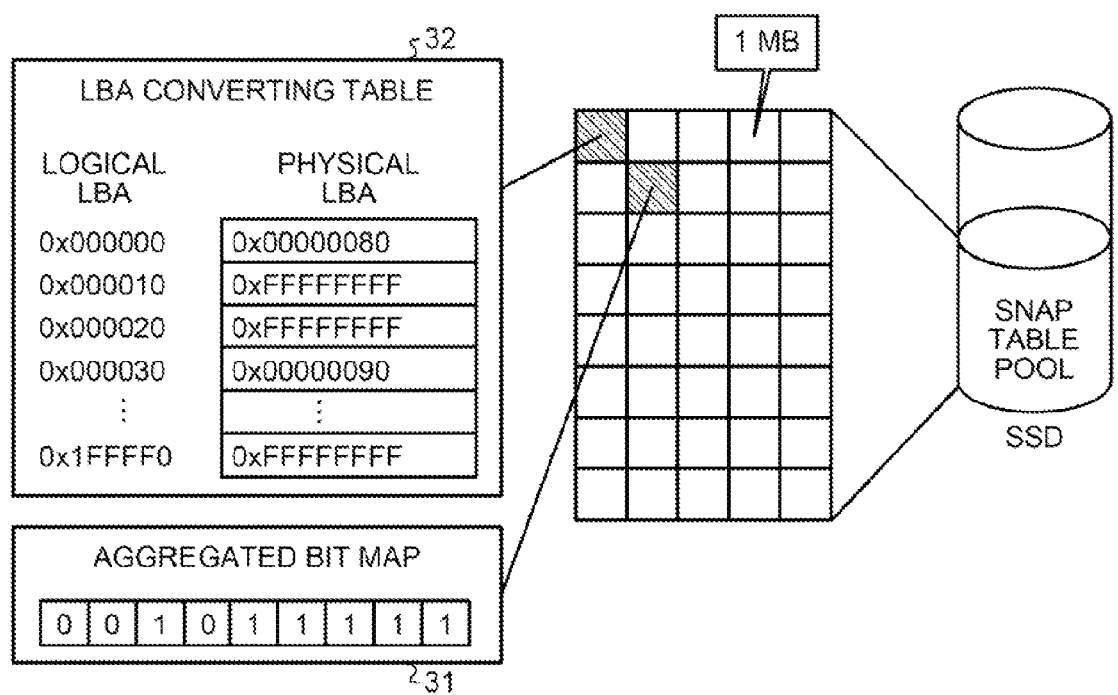
FIG. 8 is a diagram that illustrates elements within a snap table pool.

Here, elements within the snap table pool will be described with reference to FIG. 8. FIG. 8 is a diagram that illustrates the elements within the snap table pool. As illustrated in FIG. 8, the snap table pool is divided such that a partition of 1 MB is configured as one element. Then, the session managing unit 845 allocates elements corresponding to the number of elements, which are needed, to the LBA converting table 32 and the aggregated bit map 31. In a case where the elements are not employed, and the snap table pool is simply used as a continuous area, as the acquisition and the release of an area are repeated, a usable area is in a discrete state. In such a case, even when there is an empty place in the capacity, there may be a case where an area is not secured as a continuous area. Thus, when a session is generated, the session managing unit 845 allocates elements corresponding to the number of needed elements regardless of a continuous area. Here, one element corresponds to "0x200000" (hexadecimal number) blocks of the logical LBA, in other words, an area of the copy source volume that corresponds to 1 GB in the LBA converting table 32. In addition, one element corresponds to an area of the copy source volume that corresponds to 1 GB in the aggregated bit map 31 (in a case where four generations are configured as one package). In other words, when the copy destination reading unit 843 reads the logical LBA corresponding to the target area from the aggregated bit map 31, by reading only one element, the presence/no-presence of copies of all the aggregated generations relating to the logical LBA may be acquired. Accordingly, even in a case where the number of the generations of the backup is increased, the deterioration of the performance of the reading process for the copy destination volume may be prevented.

Sequence of Writing Process of Writing Data into Copy Source Volume

Next, the sequence of a writing process of writing data into the copy source volume will be described with reference to FIG. 9. FIG. 9 is a flowchart that illustrates the sequence of the writing process of writing data into the copy source volume.

First, the copy source writing unit 842 determines whether or not a write request for writing data into the copy source volume has been received from the host 1 in Step S11. In a case where it is determined that the write request for writing data into the copy source volume has not been received from the host 1 (No in Step S11), the copy source writing unit 842 repeats the determination process until the request is received.

On the other hand, in a case where it is determined that the write request for writing data into the copy source volume has been received from the host 1 (Yes in Step S11), the copy source writing unit 842 reads the latest-generation bit map 71 from the storage unit 7 in Step S12. In the write request for writing data into the copy source volume, an LBA that is a target area for which the request is made and data for which the request has been made are included.

Then, the copy source writing unit 842 determines whether or not a target bit of the read latest-generation bit map 71 that corresponds to the target area is "1" that is the state in which copying has not been completed in Step S13. In a case where it is determined that the target bit is "0" that is the state in which copying has been completed (No in Step S13), the copy source writing unit 842 proceeds to Step S17.

In a case where it is determined that the target bit is "1" that is not the state in which copying has been completed (Yes in Step S13), the copy source writing unit 842 copies data of the target area of the copy source volume to a physical LBA that is an empty area of the SDV of the latest generation in Step S14. Subsequently, the copy source writing unit 842 updates the bit of the latest-generation bit map 71 that corresponds to the target area of the latest-generation with "0" that indicates a state in which copying has been completed in Step S15. In addition, the copy source writing unit 842 updates the LBA converting table 32 of the latest generation with the physical LBA as an empty area of the copy destination being associated with the target area in Step S16.

Thereafter, the copy source writing unit 842 writes the data for which the write request has been made in the target area of the copy source volume for which writing has been requested from the host 1 in Step S17.

Sequence of Reading Process for Copy Destination Volume

Figure 10A:
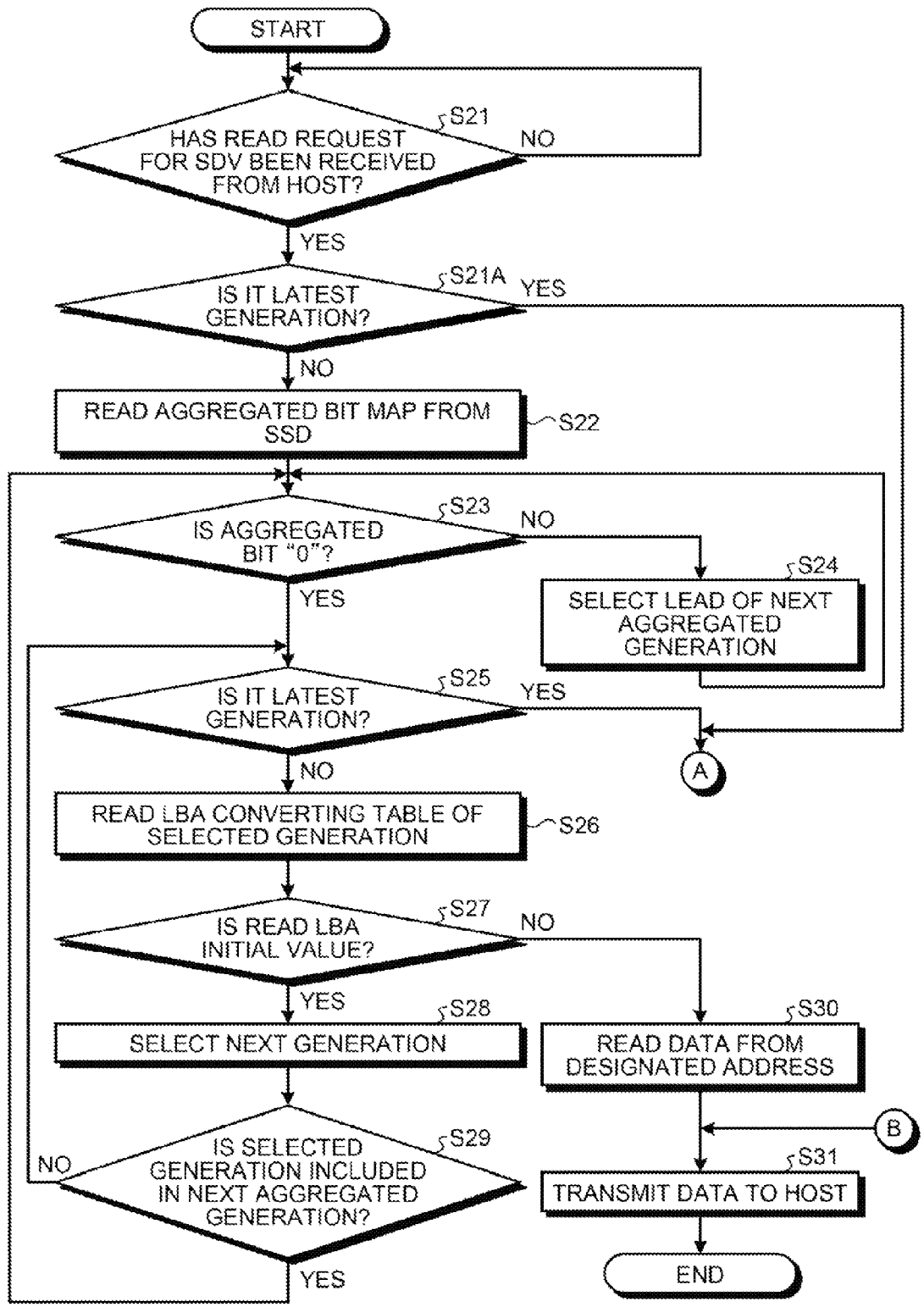
FIG. 10A is a flowchart that illustrates a sequence of a reading process for a copy destination volume.

Next, the sequence of the reading process for the copy destination volume will be described with reference to FIGS. 10A and 10B. FIG. 10A is a flowchart (1) that illustrates the sequence of the reading process for the copy destination volume. FIG. 10B is a flowchart (2) that illustrates the sequence of the reading process for the copy destination volume. Here, the aggregated bit map 31 and the LBA converting table 32 are assumed to be stored in the snap table pool of the SSD. In addition, the latest-generation bit map 71 is assumed to be stored in a memory as an example of the storage unit 7.

First, the copy destination reading unit 843 determines whether or not a read request for the SDV (copy destination volume) has been received from the host 1 in Step S21. In a case where it is determined that the read request for the SDV has not been received from the host 1 (No in Step S21), the copy destination reading unit 843 repeats the determination process until the request is received.

On the other hand, in a case where it is determined that the read request for the copy destination volume has been received from the host 1 (Yes in Step S21), the copy destination reading unit 843 determines whether or not it is the latest generation in Step S21A. In a case where it is not the latest generation (No in Step S21A), the aggregated bit map 31 is read from the SSD in Step S22. More specifically, in a case where it is determined that the read request for reading data into the copy destination volume has been received, the copy destination reading unit 843 acquires a target generation and a logical LBA as a target area for which the request has been made. Then, the copy destination reading unit 843 selects the target generation. Then, the copy destination reading unit 843 reads the presence/non-presence of a copy relating to the acquired logical LBA from the aggregated bit map 31.

Then, the copy destination reading unit 843 determines whether or not the aggregation bit of the read aggregated bit map 31 for the aggregated generation including the target generation is "0" that indicates a state in which copying has been completed in Step S23. In a case where the aggregation bit is determined not to be "0" that indicates a state in which copying has been completed (No in Step S23), the copy destination reading unit 843 selects a lead generation of the next aggregated generation in Step S24. Then, the copy destination reading unit 843 proceeds to Step S23 so as to check the aggregation bit for the next aggregated generation.

In a case where the aggregation bit is determined to be "0" that indicates a state in which copying has been completed (Yes in Step S23), the copy destination reading unit 843 determines whether or not the selected generation is the latest generation in Step S25. In a case where the selected generation is not the latest generation (No in Step S25), the copy destination reading unit 843 reads the LBA converting table 32 of the selected generation in Step S26. More specifically, the copy destination reading unit 843 reads the physical LBA of the LBA converting table 32 that corresponds to the logical LBA.

Subsequently, the copy destination reading unit 843 determines whether or not the read physical LBA is the initial value in Step S27. In a case where the read physical LBA is determined to be the initial value (Yes in Step S27), the copy destination reading unit 843 selects the next generation in Step S28. Then, the copy destination reading unit 843 determines whether or not the selected generation is included in the next aggregated generation in Step S29.

In a case where the selected generation is determined to be included in the next aggregated generation (Yes in Step S29), the copy destination reading unit 843 proceeds to Step S23 so as to check the aggregation bit of the next aggregated generation. On the other hand, in a case where the selected generation is determined not to be included in the next aggregated generation (No in Step S29), the copy destination reading unit 843 proceeds to Step S25.

The process is returned to Step S27, and, in a case where the read physical LBA is determined not to be the initial value (No in Step S27), the copy destination reading unit 843 reads data of the SDV of the selected generation from the read physical LBA in Step S30. Then, the copy destination reading unit 843 proceeds to Step S31.

The process is returned to Step S21A, and, in a case where the selected generation is the latest generation (Yes in Step S21A), the copy destination reading unit 843 proceeds to Step S41.

The process is returned to Step S25, and, in a case where the selected generation is the latest generation (Yes in Step S25), the copy destination reading unit 843 proceeds to Step S41.

Subsequently, the copy destination reading unit 843 checks the bit of the latest generation by using the latest-generation bit map 71 stored in the memory in Step S41. More specifically, the copy destination reading unit 843 refers to the bit corresponding to the logical LBA that is the target area for which the read request for the SDV is made.

Then, the copy destination reading unit 843 determines whether or not the bit as a checking target is "0", which indicates that copying has been completed, in Step S42. In a case where the bit as the checking target is determined to be "0" that indicates a state in which copying has been completed (Yes in Step S42), the copy destination reading unit 843 reads the LBA converting table 32 of the latest generation. Then, the copy destination reading unit 843 acquires a physical LBA of the LBA converting table 32 that corresponds to the logical LBA in Step S43. Then, the copy destination reading unit 843 reads data of the SDV of the latest generation from the acquired physical LBA in Step S44. Then, the copy destination reading unit 843 proceeds to Step S31.

On the other hand, in a case where the bit as the checking target is determined not to be "0" that indicates a state in which copying has been completed (No in Step S42), the copy destination reading unit 843 reads data of the copy source volume from the logical LBA as the target area in Step S45. Then, the copy destination reading unit 843 proceeds to Step S31.

Subsequently, the copy destination reading unit 843 transmits the read data to the host 1 in Step S31.

Sequence of Writing Process of Writing Data into Copy Destination Volume

Next, the sequence of the writing process of writing data into the copy destination volume will be described with reference to FIG. 11. FIG. 11 is a flowchart that illustrates the sequence of the writing process of writing data into the copy destination volume. Here, the aggregated bit map 31 and the LBA converting table 32 are assumed to be stored in the snap table pool of the SSD. In addition, the latest-generation bit map 71 is assumed to be stored in memory as an example of the storage unit 7.

First, the copy destination writing unit 844 determines whether or not a write request for writing data into the SDV (copy destination volume) has been received from the host 1 in Step S51. In a case where it is determined that the write request for writing data into the SDV has not been received from the host 1 (No in Step S51), the copy destination writing unit 844 repeats the determination process until the request is received.

On the other hand, in a case where it is determined that the write request for writing data into the copy destination volume has been received from the host 1 (Yes in Step S51), the copy destination writing unit 844 reads an LBA converting table 32 of a target generation for which the write request has been made in Step S52. More specifically, the copy destination writing unit 844 reads a physical LBA of the LBA converting table 32 that corresponds to the logical LBA as a target area for which the write request has been made.

Subsequently, the copy destination writing unit 844 determines whether or not the read physical LBA is the initial value in Step S53. In a case where the read physical LBA is determined to be the initial value (Yes in Step S53), the copy destination writing unit 844 copies data of the target area of the copy source volume to the physical LBA that is an empty area of the SDV that corresponds to the target generation in Step S54.

Subsequently, the copy destination writing unit 844 updates the LBA converting table 32 of the target generation with the physical LBA as the empty area of the copy destination being associated with the logical LBA as the target area in Step S55. In addition, the copy destination writing unit 844 updates the aggregated bit map 31 placed in the SSD with "0" that indicates that copying has been completed in Step S56. More specifically, the copy destination writing unit 844 updates a bit of the aggregated generation that includes the target generation with "0" for the logical LBA as the target area of the aggregated bit map 31. Then, the copy destination writing unit 844 proceeds to Step S57.

The process is returned to Step S53, and, in a case where the read physical LBA is determined not to be the initial value (No in Step S53), the copy destination writing unit 844 proceeds to Step S57. Subsequently, the copy destination writing unit 844 writes data for which the write request for the target area of the SDV has been made in the target area of the SDV for which the write request has been made from the host 1 in Step S57.

Sequence of Generating Snapshot

Next, the sequence of generating the snapshot will be described with reference to FIG. 12. FIG. 12 is a flowchart that illustrates the sequence of generating the snapshot. Here, the aggregated bit map 31 and the LBA converting table 32 are assumed to be stored in the snap table pool of the SSD. In addition, the latest-generation bit map 71 is assumed to be stored in memory as an example of the storage unit 7.

First, the session managing unit 845 determines whether or not a snapshot generating request has been received from the host 1 in Step S61. In a case where it is determined that the snapshot generating request has not been received from the host 1 (No in Step S61), the session managing unit 845 repeats the determination process until the request is received.

On the other hand, in a case where it is determined that the snapshot generating request has been received from the host 1 (Yes in Step S61), the session managing unit 845 generates a session managing table 72 of the target generation for which the request has been made in Step S62. For example, the session managing unit 845 stores the identification number of the copy source volume in the copy source volume number 72a of the session managing table 72. In addition, the session managing unit 845 stores the identification number of the copy destination volume that corresponds to the target generation in the copy destination volume number 72b of the session managing table 72. Furthermore, the session managing unit 845 stores a lead LBA of the copy source volume in a lead LBA 72c of the copy source volume of the session managing table 72. In addition, the session managing unit 845 stores a lead LBA of the copy destination volume that corresponds to the target generation in a lead LBA 72d of the copy destination volume of the session managing table 72. Furthermore, the session managing unit 845 stores a total number of blocks of the copy source volume as the copy target in the copy target block number 72e of the session managing table 72. The session managing unit 845 stores the identification number of the target generation in the generation number 72f of the session managing table 72.

Then, the session managing unit 845 allocates elements that are needed for the LBA converting table 32 from the snap table pool of the SSD and is connected to the session managing table 72 in Step S63. For example, the session managing unit 845 acquires elements corresponding to a total number of blocks of the copy source volume and is connected to the session managing table 72 of a new generation as the LBA converting table 32.

Subsequently, the session managing unit 845 determines whether or not it is the generation of a generation for the first time in Step S64. In a case where the generation of the generation is determined to be the first time (Yes in Step S64), the session managing unit 845 allocates the latest-generation bit map 71 to the memory and initializes the bits to "1" that indicates that copying has not been completed in Step S65.

Then, the session managing unit 845 allocates elements that are needed for the aggregated bit map 31 from the snap table pool, initializes the bits to "1" that indicates that copying has not been completed, and is connected to the session managing table 72 in Step S66. For example, the session managing unit 845 acquires elements corresponding to the total number of blocks of the copy source volume and the number of generations that may be generated, and is connected to the session managing table 72 of the new generation as the aggregated bit map 31. Then, the session managing unit 845 ends the generation of the generation for the first time.

On the other hand, in a case where the generation of the generation is determined not to be generation of the first time (No in Step S64), the session managing unit 845 reflects the latest generation at a time point when the latest-generation bit map 71 is generated on the aggregated bit map 31, sets the generation generated this time is as the latest generation, and proceeds to Step S67. In addition, the session managing unit 845 sets the LBA corresponding to each bit of the latest-generation bit map 71 as the lead LBA in Step S67. Then, the session managing unit 845 determines whether or not a bit corresponding to the set LBA is "0" that represents a state in which copying has been completed in Step S68.

In a case where the bit corresponding to the set LBA is determined to be "0" (Yes in Step S68), the session managing unit 845 updates the aggregated bit map 31 with "0" that represents a state in which copying has been completed in Step S69. For example, the session managing unit 845 reads a bit group relating to the LBA with the set LBA used as a key from the aggregated bit map 31 of the SDV. Then, the session managing unit 845 updates a bit, in which the latest generation at a time point when the latest-generation bit map 71 is generated is included, with "0" and writes back the bit into the SDV. Then, the session managing unit 845 proceeds to Step S70.

On the other hand, in a case where the bit corresponding to the set LBA is determined not to be "0" (No in Step S68), the session managing unit 845 proceeds to Step S70 without performing any process.

Subsequently, the session managing unit 845 sets an LBA that is in correspondence with each bit of the latest-generation bit map 71 as a next LBA in Step S70. Then, the session managing unit 845 determines whether or not the set LBA exceeds the final LBA in Step S71.

In a case where the set LBA is determined not to exceed the final LBA (No in Step S71), the session managing unit 845 proceeds to Step S68 so as to check the bit corresponding to the set LBA. On the other hand, in a case where the set LBA is determined to exceed the final LBA (Yes in Step S71), the session managing unit 845 initializes each bit of the latest-generation bit map 71 to "1" that represents a state in which copying has not been completed in Step S72. Then, the session managing unit 845 ends the generation of this generation.

Sequence of Removing Snapshot

Figure 13:
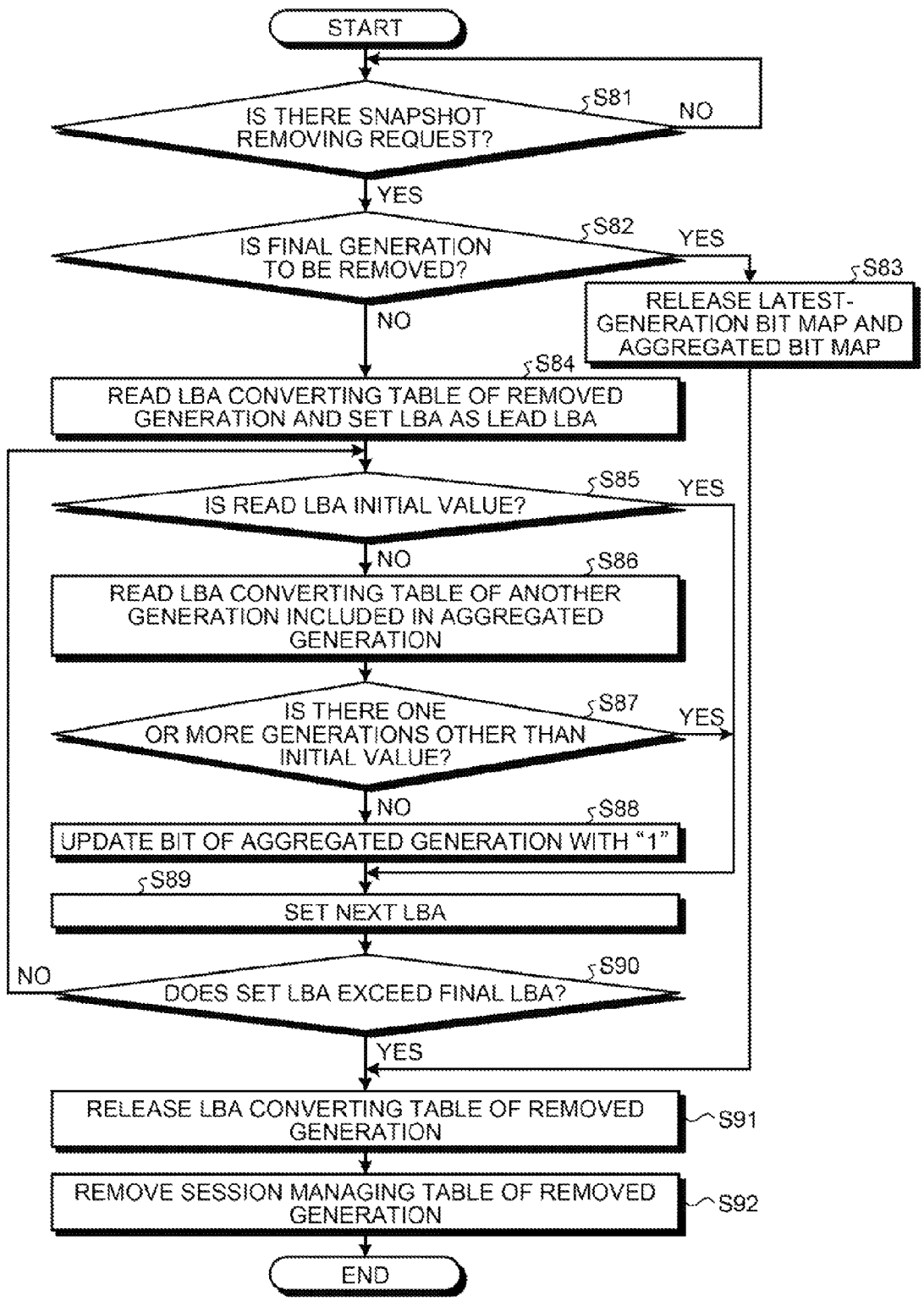
FIG. 13 is a flowchart that illustrates a sequence of removing a snapshot.

Next, the sequence of removing a snapshot will be described with reference to FIG. 13. FIG. 13 is a flowchart that illustrates the sequence of removing the snapshot. Here, the aggregated bit map 31 and the LBA converting table 32 are assumed to be stored in the snap table pool of the SSD. In addition, the latest-generation bit map 71 is assumed to be stored in memory as an example of the storage unit 7.

First, the session managing unit 845 determines whether a snapshot removing request has been received from the host 1 in Step S81. In a case where it is determined that the snapshot removing request has not been received from the host 1 (No in Step S81), the session managing unit 845 repeats the determination process until the request is received.

On the other hand, in a case where it is determined that the snapshot removing request has been received from the host 1 (Yes in Step S81), the session managing unit 845 determines whether or not the final generation is to be removed in Step S82. In a case where the final generation is determined to be removed (Yes in Step S82), the session managing unit 845 releases the latest-generation bit map 71 and the aggregated bit map 31 in Step S83 and proceeds to Step S91.

On the other hand, in a case where the final generation is determined not to be removed (No in Step S82), the session managing unit 845 reads the LBA converting table 32 of the generation to be removed and sets the logical LBA as the lead logical LBA in Step S84. Subsequently, the session managing unit 845 determines whether or not the physical LBA corresponding to the set logical LBA is the initial value in Step S85. In a case where the physical LBA corresponding to the set logical LBA is determined to be the initial value (Yes in Step S85), the session managing unit 845 proceeds to Step S89 while the bits of the aggregated generation that includes the generation to be removed are maintained as they are.

On the other hand, in a case where the physical LBA corresponding to the set logical LBA is determined not to be initial value (No in Step S85), the session managing unit 845 reads a LBA converting table 32 of another generation that is included in the corresponding aggregated generation in Step S86. Then, the session managing unit 845 determines whether or not there is one or more generations in which the physical LBA corresponding to the set logical LBA is not the initial value in Step S87.

In a case where it is determined that there is one or more generations in which the physical LBA is not the initial value (Yes in Step S87), the session managing unit 845 proceeds to Step S89 while the bits of the corresponding aggregated generation are maintained as they are. On the other hand, in a case where it is determined that there is not one or more generations in which the physical LBA is not the initial value (No in Step S87), the session managing unit 845 updates the bit of the corresponding aggregated generation with "1" that indicates a state in which copying has not been completed in Step S88 and proceeds to Step S89.

Subsequently, the session managing unit 845 set the logical LBA to the next logical LBA in Step S89. Then, the session managing unit 845 determines whether or not the set logical LBA exceeds the final logical LBA in Step S90.

In a case where it is determined that the set logical LBA does not exceed the final logical LBA (No in Step S90), the session managing unit 845 proceeds to Step S85 so as to check the physical LBA corresponding to the set logical LBA. On the other hand, in a case where it is determined that the set logical LBA exceeds the final logical LBA (Step S90: Yes), the session managing unit 845 releases the LBA converting table 32 of the generation to be removed in Step S91. Then, the session managing unit 845 removes the session managing table 72 of the generation that is to be removed in Step S92. Then, the session managing unit 845 ends the snapshot removing process.

In addition, the aggregated bit map 31 has been described in which whether or not copying data into the copy destination volume for each aggregated generation is stored in association with the logical LBA. The aggregated generation is a generation that is acquired by packaging a plurality of generations. However, in the aggregated bit map 31, by replacing the aggregated generation by one generation, whether copying data into the copy destination volume has been performed for each one generation may be stored in association with the logical LBA. Here, a modified example of the data structure of an aggregated bit map 31A according to the first embodiment will be described with reference to FIG. 14.

Figure 14:
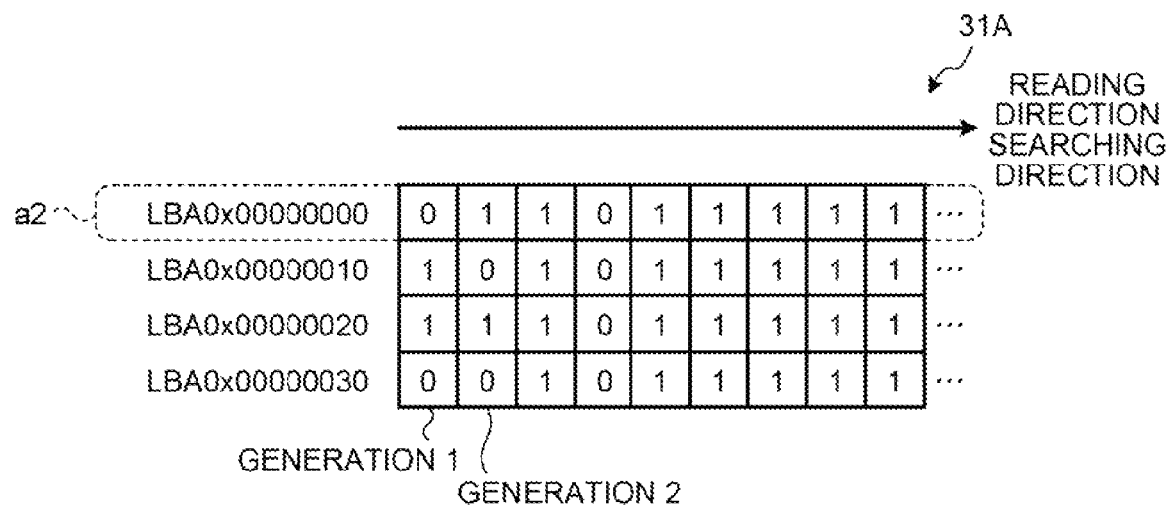
FIG. 14 is a diagram that illustrates a modified example of a data structure of an aggregated bit map according to the first embodiment.

FIG. 14 is a diagram that illustrates the modified example of the data structure of the aggregated bit map according to the first embodiment. As illustrated in FIG. 14, the presence/no-presence of a copy for the copy destination volume for each one generation is stored in association with the logical LBA. For example, as denoted by reference symbol a2, in a case where the target area is LBA 0x00000000 (hexadecimal number), the presence/no-presence of a copy is stored as "011011111 . . . ". In other words, as the presence/no-presence of a copy of generation 1, "0" representing a state in which copying has been completed is stored, and, as the presence/no-presence of a copy of generation 2, "1" representing a state in which copying has not been completed is stored.

Advantage of First Embodiment

According to the first embodiment described above, the storage device 2 stores the presence/no-presence of a copy of data of the logical LBA of the copy source volume for the copy destination volume for each generation in the aggregated bit map 31 of the drive 3 in association with the logical LBA. Then, when a read request for reading data for the copy destination volume is received, the storage device 2 accesses the logical LBA for which a read request is made by using the presence/no-presence of a copy for each generation, which is stored in the aggregated bit map 31, in association with the logical LBA. According to such a configuration, since the storage device 2 stores the presence/no-presence of a copy for the copy destination volume for each generation in the aggregated bit map 31 in association with the logical LBA, the presence/no-presence of a copy for the copy destination volume for each generation, which is associated with the logical LBA for which the read request has been made, may be collectively read. Accordingly, even in the case of the non-presence of a copy of the target generation for which the read request has been made, the storage device 2 may retrieve generations for which the copy is present at a high speed. In other words, the storage device 2 decreases the number of accesses to the drive 3, compared to a conventional copy bit map in which the presence/no-presence of each logical LBA is associated with the generation, whereby the generation for which the copy is present may be retrieved at a high speed. As a result, the storage device 2 may improve the performance of reading data for the copy destination volume.

In addition, according to the first embodiment described above, the storage device 2 stores the presence/no-presence of a copy of the data of the logical LBA of the copy source volume for the copy destination volume for a plurality of generations as a package in the aggregated bit map 31 of the drive 3 in association with the logical LBA. Then, the storage device 2 accesses the logical LBA for which the read request has been made by using the presence/no-presence of a copy for each of a plurality of generations, which is stored in the aggregated bit map 31, in association with the logical LBA.

According to such a configuration, since the storage device 2 stores the presence/no-presence of a copy for the copy destination volume for a plurality of generations as a package in association with the logical LBA, the presence/no-presence of a copy for each of a plurality of generations associated with the logical LBA for which the read request has been made may be collectively read. Accordingly, even in a case where the presence/no-presence of a copy for a plurality of generations including the target generation for which the read request has been made is no-presence of a copy, the storage device 2 may retrieve a plurality of generations for which copying has been performed at a high speed. In other words, since the storage device 2 decreases the number of accesses to the drive 3, compared to a conventional copy bit map in which the presence/no-presence of a copy for each logical LBA is associated with the logical LBA, and accordingly, a plurality of generations having generations of the presence of a copy may be retrieved at a high speed.

Furthermore, according to the first embodiment described above, the storage device 2 stores the physical LBA of the copy destination volume for the logical LBA of the copy source volume for each generation in the LBA converting table 32 of the drive 3. The storage device 2 retrieves the presence/no-presence of a copy including the target generation for which the read request has been made from the information corresponding to the logical LBA that is stored in the aggregated bit map 31 and determines whether or not there is a copy based on the acquired presence/no-presence of the copy. Then, in a case where it is determined that a copy is present, the storage device 2 reads the physical LBA for the logical LBA for which read request has been made from the LBA converting table 32 of the target generation and reads data from the physical LBA in a case where the read physical LBA is not the initial value. On the other hand, in a case where the read physical LBA is the initial value, the storage device 2 reads data of a generation other than the target generation out of a plurality of generations for which copies are determined to be present. In such a configuration, in a case where one of a plurality of generations that include the target generation, for which the read request has been made, has a copy, even when there is no copy of the target generation, the storage device 2 may read data from one of the plurality of generations, and accordingly, the range of generations of which data is read may be limited on an early stage.

In addition, according to the first embodiment described above, in a case where the generation designated in accordance with the read request is the latest generation, and it is determined that there is no copy of the latest generation, the storage device 2 accesses the copy source volume. In such a configuration, even in a case where there is no copy of the latest generation, the storage device 2 may search for the data of the copy source volume of the latest generation as data of the copy destination volume, and accordingly, the performance of reading data into the copy destination volume may be improved.

Furthermore, according to the first embodiment described above, when a write request for writing data into the copy destination volume is received, in a case where the physical address that is acquired from the LBA converting table 32 of a generation for which the write request has been made is the initial value, the storage device 2 writes the data for which the write request has been made in an empty area of the generation in the copy destination volume. In addition, the storage device 2 writes information of the presence of a copy in the information of the aggregated bit map 31, which relates to the presence/no-presence of a copy, corresponding to the generation. In such a configuration, when data is written into the generation for which the write request has been made, the storage device 2 writes information of the presence of a copy in the information of the aggregated bit map 31, which relates to the presence/no-presence of a copy, corresponding to the generation. Accordingly, the next time, when a read request for reading data into the copy destination volume for a generation included in the same package as that of the present generation is received, the storage device 2 may perform reading by using the aggregated bit map 31, whereby the data of the generation that is included in the same package as that of the present generation may be retrieved at a high speed.

In addition, in the storage device 2, the drive 3 is configured by an SSD or a HDD. In such a configuration, even in a case where the number of generations is increased, the storage device 2, unlike the case of memory, may prevent a problem that it is difficult to increase the number of generations due to a shortage of the capacity.

[b] Second Embodiment

In the storage device 2 according to the first embodiment, a case has been described in which the aggregated bit map 31 stores the presence/no-presence of a copy, which is copied into the copy destination volume, for each aggregated generation in association with the logical LBA. However, the storage device 2 is not limited thereto, but an aggregated bit map 31B may store the presence/no-presence of a copy, which is copied into the copy destination volume, for each logical LBA in association with the aggregated generation.

Thus, in a second embodiment, a case will be described in which the aggregated bit map 31B stores the presence/no-presence of a copy, which is copied to the copy destination volume, for each logical LBA in association with the aggregated generation.

Configuration of Storage Device According to Second Embodiment

The functional block diagram that illustrates the configuration of a storage device 2 according to the second embodiment is similar to that of the storage device 2 illustrated in FIG. 1, and thus duplicate description of the same configuration and the same operation will not be presented here. the second embodiment is different from the first embodiment in which the data structure of the aggregated bit map 31B is changed.

Figure 15:
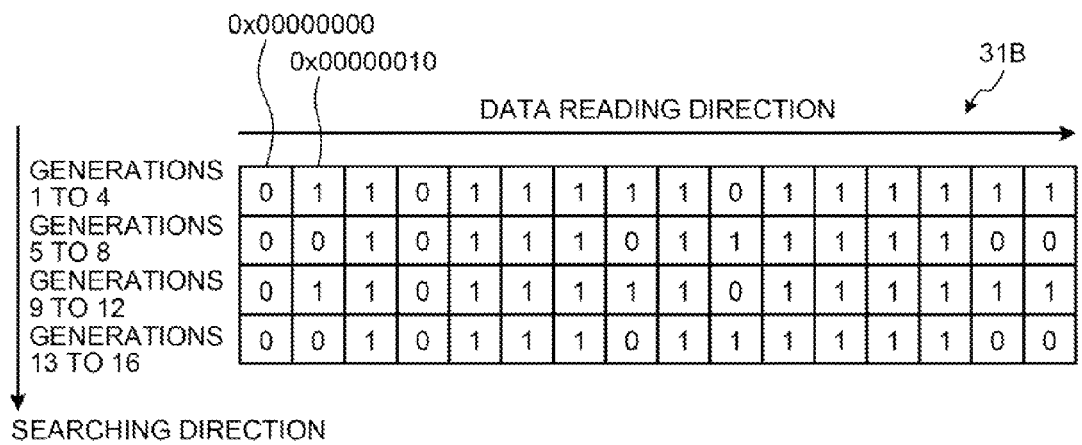
FIG. 15 is a diagram that illustrates a data structure of an aggregated bit map according to a second embodiment.
Figure 16:
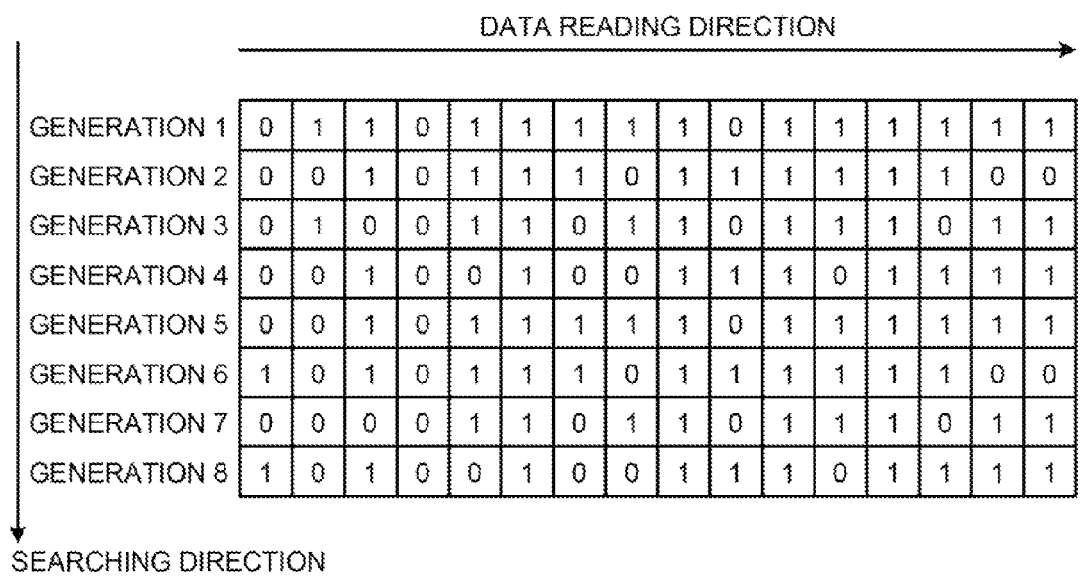
FIG. 16 is a diagram that illustrates a data structure of a conventional copy bit map.

FIG. 15 is a diagram that illustrates the data structure of the aggregated bit map according to the second embodiment. As illustrated in FIG. 15, the aggregated bit map 31B stores the presence/no-presence of a copy, which is copied into a copy destination volume, for each logical LBA in association with the aggregated generation. Here, "0" is a bit value that represents a state in which data of the target area of the copy source volume has been completed to be copied to a copy destination volume of one of a plurality of generations. On the other hand, "1" is a bit value that represents a state in which data of the target area of the copy source volume has not been completed to be copied to any one copy destination volume of one of a plurality of generations. For example, In the case of an aggregated generation having four generations from generation 1 to generation 4 as a package, the presence/no-presence of a copy, which is copied into the copy destination volume, is stored as "011011111 . . . ". In a case where the logical LBA as a target area is "0x00000000", "0" that represents a state in which the data of the target area has been completed to be copied is stored. In a case where the logical LBA as a target area is "0x00000010", "1" that represents a state in which the data of the target area has not been completed to be copied is stored.

In addition, one unit of the logical LBA is set as 16 blocks (8 kilobytes (KB)). Here, it is assumed that information of the latest generation is not reflected on the aggregated generation in the aggregated bit map 31B. The reason for this is that there is a latest-generation bit map 71 as information of the latest generation. However, the aggregated bit map 31B is not limited thereto, but the information of the latest generation may be reflected on the aggregated generation.

Furthermore, in the example illustrated in FIG. 15, in an aggregated bit map 31B, although one aggregated generation has been described to be acquired by packaging four generations, the packaging is not limited to be performed for each four generations, but it may be performed, for example, for each three generations or for each five generations.

In a case where a read request for the copy destination volume is received from the host 1, the copy destination reading unit 843 illustrated in FIG. 1 reads the presence/no-presence of a copy of the aggregated generation that includes the target generation for which the request has been made from the aggregated bit map 31. Then, the copy destination reading unit 843 acquires the presence/no-presence of a copy corresponding to the logical LBA as a target area for which the request has been made based on the presence/no-presence of a copy, which has been read, relating to the aggregated generation.

In a case where the presence/no-presence of a copy represents a state in which copying has been completed, the copy destination reading unit 843 reads the address of the physical area for the logical LBA as a target area from the LBA converting table 32 of the target generation. Then, in a case where the read address of the target generation is not the initial value, the copy destination reading unit 843 reads data represented by the address. On the other hand, in a case where the read address of the target generation is the initial value, the copy destination reading unit 843 reads data of a generation other than the target generation, which is included in the aggregated generation that has been determined to be in a state in which copying has been completed, similarly to the process performed in the case of the target generation.

On the other hand, in a case where the presence/no-presence of a copy represents a state in which copying has not been completed, the copy destination reading unit 843 reads the presence/no-presence of a copy of the next aggregated generation from the aggregated bit map 31 so as to sequentially search for other generations. Then, the copy destination reading unit 843 reads data using the presence/no-presence of a copy, which has been read, similarly to the process performed in the case of the aggregated generation that includes the target generation.

In addition, the copy destination reading unit 843 transmits the read data to the host 1. Furthermore, in a case where the information of the latest generation is not reflected on the aggregated generation of the aggregated bit map 31B, the copy destination reading unit 843 sets up to an aggregated generation that includes a generation that is one generation before the latest generation as a search target. Then, in a case where the aggregated generation including the generation that is one generation before the latest generation is not in the state in which copying has not been completed, the copy destination reading unit 843 may refer to the presence/no-presence of a copy corresponding to the logical LBA as a target area by using the latest-generation bit map 71.

Advantage of Second Embodiment

According to the second embodiment described above, for data of the logical LBA of the copy source volume, the storage device 2 stores the presence/no-presence of a copy, which is copied into the copy destination volume, for each logical LBA in the aggregated bit map 31B of the drive 3 in association with generation information that is packaged for a plurality of generations. Then, when a read request for reading data into the copy destination volume is received, the storage device 2 accesses the logical LBA for which a read request has been made by using the presence/no-presence of a copy, which is stored in the aggregated bit map 31B, associated with the generation information. In such a configuration, the storage device 2 reads the presence/no-presence of a copy for each logical LBA, in which a plurality of generations is packaged, from the aggregated bit map 31B. Accordingly, even in the case of the no-presence of a copy of the target generation for which the read request has been made, the storage device 2 may retrieve generations for which copies are present at a high speed. In other words, in a conventional copy bit map in which the presence/no-presence of a copy for each logical LBA is associated with the generation, in a case where there is no-presence of a copy for the target generation, information of the further next generation is read from the copy bit map. Accordingly, the storage device 2, compared to the conventional copy bit map, may decreased the number of times of reading the aggregated bit map 31B to 1/(number of a plurality of generations that are packaged), and therefore, the generations for which copies are present may be retrieved at a high speed. As a result, the storage device 2 may improve the performance of reading data for the copy destination volume.

Others

The constituent elements of the storage device 2 illustrated in the figures are not necessarily physically configured as illustrated in the figures. In other words, a specific divided or integrated form of the storage device 2 is not limited to those illustrated in the figures. The whole or a part thereof may be configured so as to be divided or integrated functionally or physically in an arbitrary unit in accordance with various loads, use situations, and the like. For example, the copy source reading unit 841 and the copy source writing unit 842 may be integrated as one unit. In addition, the copy destination reading unit 843 and the copy destination writing unit 844 may be integrated as one unit. Furthermore, the copy destination reading unit 843 may be divided into a first search unit that searches for the presence/no-presence of a copy corresponding to the target area from the information of the aggregated generation and a second search unit that searches for the presence/no-presence of a copy corresponding to the target area from the information of the latest generation. In addition, the storage unit 7 may be configured so as to be connected through a network as an external device of the CM 5.

In addition, all or some of the processing functions performed by the CM 5 may be realized by a CPU (a microcomputer such as an MPU or an MCU (micro controller unit) or a wired logic as hardware. Furthermore, all or some of the processing functions performed by the control unit 8 may be realized by a program that is interpreted and executed by a CPU (a microcomputer such as an MPU or an MCU).

According to one aspect of a storage device disclosed in this application, there is an advantage of preventing the deterioration of the performance for the copy-on-write even in a case where the number of backup generations is increased.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device that copies copy source data stored in a copy source volume to a copy destination volume and manages copied data in units of generations, the storage device comprising:
   a first storing unit that stores information representing presence/no-presence of a copy in association with a logical address of the copy destination volume;
   a second storing unit that stores a physical address of the copy destination volume that corresponds to the logical address; and
   a processor that is programmed to determine, when receiving an access request for a predetermined logical address of a generation in a copy destination volume, presence/non-presence of a copy for the logical address of the generation for which the access is requested by using information which is stored in the first storing unit, and to access a physical address of the copy destination volume acquired from the second storing unit for the generation in a case where the presence of the copy is determined.

2. The storage device according to claim 1, wherein the first storing unit stores the information relating to the presence/no-presence of a copy in units of generations, each unit being configured by packaging a plurality of generations, in association with each logical address of the copy destination volume.

3. The storage device according to claim 1, wherein the processor is programmed
   to determine, when receiving a read request for a copy destination volume, the presence/no-presence of a copy of a logical address of a generation that is designated by the read request by using the information stored in the first storing unit, and to access
   (i) in a case where the presence of the copy is determined, a physical address of the copy destination volume of the designated generation acquired from the second storing unit, and
   (ii) in a case where the acquired physical address is an initial value, a physical address of the copy destination volume acquired from the second storing unit, of a generation other than the designated one selected from generations for which it is determined that the copy is present.

4. The storage device according to claim 3, wherein the processor is programmed to access the copy source volume in a case where the generation designated by the read request is a latest generation, and the no-presence of a copy of the latest generation is determined.

5. The storage device according to claim 1, wherein the processor is programmed to write, when receiving a write request for the copy destination volume and when a physical address acquired from the second storing unit corresponding to the generation designated in the write request is an initial value, data requested to be written in an empty area in the copy destination volume of the designated generation and to write information indicating that a copy is present in the first storing unit corresponding to the designated generation.

6. The storage device according to claim 1, wherein the first storing unit and the second storing unit are an SSD (solid state drive) or an HDD (hard disk drive).

7. A storage device that copies copy source data stored in a copy source volume to a copy destination volume and manages copied data in units of generations, the storage device comprising:
   a storing unit that, for data of each area of the copy source volume, stores information representing presence/no-presence of a copy for each area of the copy destination volume in association with a plurality of generations; and
   a processor that is programmed to determine, when receiving an access request for a predetermined area of a generation in the copy destination volume, presence/no-presence of a copy for the predetermined area in association with a plurality of generations including the generation for which the access is requested by using information which is stored in the storing unit, and to access data of the predetermined area for any of the generation that is included in the plurality of generations in a case where the presence of the copy is determined.

8. A method of accessing copy destination data that is performed by a storage device that copies copy source data stored in a copy source volume to a copy destination volume and manages copied data in units of generations, the method comprising:
   determining, when receiving an access request for a predetermined logical address of a generation in a copy destination volume, presence/no-presence of a copy for the logical address of the generation for which the access is requested by using information which is stored in a first storing unit, the first storing unit storing information representing presence/no-presence of a copy in association with a logical address of the copy destination volume; and
   accessing a physical address of the copy destination volume acquired from a second storing unit for the generation in a case where the presence of the copy is determined, the second storing unit storing a physical address of the copy destination volume that corresponds to the logical address.

* * * * *